(12) United States Patent
Mizuta et al.

(10) Patent No.: US 9,322,088 B2
(45) Date of Patent: Apr. 26, 2016

(54) HIGH-STRENGTH STEEL SHEET AND METHOD FOR PRODUCING THE SAME

(71) Applicant: Kabushiki Kaisha Kobe Seiko Sho (Kobe Steel, Ltd.), Kobe-shi (JP)

(72) Inventors: Sae Mizuta, Kakogawa (JP); Yukihiro Utsumi, Kakogawa (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 0 days.

(21) Appl. No.: 14/440,118

(22) PCT Filed: Dec. 6, 2013

(86) PCT No.: PCT/JP2013/082868
§ 371 (c)(1),
(2) Date: May 1, 2015

(87) PCT Pub. No.: WO2014/092025
PCT Pub. Date: Jun. 19, 2014

(65) Prior Publication Data
US 2015/0299834 A1 Oct. 22, 2015

(30) Foreign Application Priority Data

Dec. 12, 2012 (JP) ................. 2012-271792

(51) Int. Cl.
*C22C 38/02* (2006.01)
*C22C 38/04* (2006.01)
(Continued)

(52) U.S. Cl.
CPC .............. *C22C 38/58* (2013.01); *B32B 15/013* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS

2008/0000555 A1  1/2008  Nonaka et al.
2008/0023112 A1  1/2008  Kashima
(Continued)

FOREIGN PATENT DOCUMENTS

JP    1-177393 A    7/1989
JP    2004-308002 A    11/2004
(Continued)

OTHER PUBLICATIONS

International Search Report and Written Opinion of the International Searching Authority issued Mar. 18, 2014, in PCT/JP2013/082868, filed Dec. 6, 2013.

*Primary Examiner* — Deborah Yee
(74) *Attorney, Agent, or Firm* — Oblon, McClelland, Maier & Neustadt, L.L.P.

(57) ABSTRACT

Provided is a high-strength steel sheet having a tensile strength of 1180 MPa or more. The high-strength steel sheet has a specific chemical composition, includes a microstructure meeting all conditions (1) to (4) as measured by specific methods at a position corresponding to one-fourth the thickness of the steel sheet, has excellent workability and low-temperature toughness, and has a tensile strength of 1180 MPa or more. (1) The microstructure includes ferrite in a volume fraction of 5% to 35% and at least one of bainitic ferrite and tempered martensite in a volume fraction of 50% or more relative to the entire microstructure. (2) The microstructure includes MA constituent in a volume fraction of 20% or less (excluding 0%) relative to the entire microstructure, where the MA constituent is a mixed phase of fresh martensite and retained austenite. (3) The microstructure includes retained austenite in a volume fraction of 5% or more relative to the entire microstructure. (4) The microstructure has an amount of stacking faults in the retained austenite of $10.0 \times 10^{-3}$ (nm/nm$^2$) or less.

5 Claims, 3 Drawing Sheets

(51) Int. Cl.
| | |
|---|---|
| C22C 38/06 | (2006.01) |
| C21D 9/06 | (2006.01) |
| C21D 6/00 | (2006.01) |
| C22C 38/58 | (2006.01) |
| C21D 9/46 | (2006.01) |
| C22C 38/00 | (2006.01) |
| C22C 38/60 | (2006.01) |
| C22C 38/08 | (2006.01) |
| C22C 38/12 | (2006.01) |
| C22C 38/14 | (2006.01) |
| C22C 38/16 | (2006.01) |
| C22C 38/36 | (2006.01) |
| C22C 38/38 | (2006.01) |
| C23C 2/06 | (2006.01) |
| C23C 2/28 | (2006.01) |
| C23C 2/40 | (2006.01) |
| C25D 5/50 | (2006.01) |
| C25D 7/06 | (2006.01) |
| C21D 8/02 | (2006.01) |
| B32B 15/01 | (2006.01) |
| C22C 38/28 | (2006.01) |
| C22C 38/34 | (2006.01) |
| C22C 38/50 | (2006.01) |
| C22C 38/54 | (2006.01) |
| C23C 2/04 | (2006.01) |
| C25D 7/00 | (2006.01) |
| C21D 1/22 | (2006.01) |

(52) U.S. Cl.
CPC ............... *C21D 6/004* (2013.01); *C21D 6/005* (2013.01); *C21D 6/008* (2013.01); *C21D 8/0247* (2013.01); *C21D 9/46* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/28* (2013.01); *C22C 38/34* (2013.01); *C22C 38/36* (2013.01); *C22C 38/38* (2013.01); *C22C 38/50* (2013.01); *C22C 38/54* (2013.01); *C22C 38/60* (2013.01); *C23C 2/04* (2013.01); *C23C 2/06* (2013.01); *C23C 2/28* (2013.01); *C23C 2/40* (2013.01); *C23C 2/405* (2013.01); *C25D 5/50* (2013.01); *C25D 7/00* (2013.01); *C25D 7/0614* (2013.01); *C21D 1/22* (2013.01); *C21D 2211/001* (2013.01); *C21D 2211/002* (2013.01); *C21D 2211/005* (2013.01); *C21D 2211/008* (2013.01)

(56) References Cited

U.S. PATENT DOCUMENTS

| | | |
|---|---|---|
| 2008/0178972 A1 | 7/2008 | Saito et al. |
| 2009/0053096 A1 | 2/2009 | Miura et al. |
| 2009/0314395 A1 | 12/2009 | Nonaka et al. |
| 2010/0221138 A1 | 9/2010 | Nakaya et al. |
| 2011/0146852 A1 | 6/2011 | Matsuda et al. |
| 2012/0175028 A1 | 7/2012 | Matsuda et al. |
| 2012/0312433 A1 | 12/2012 | Mizuta et al. |
| 2013/0087257 A1 | 4/2013 | Yoshino et al. |

FOREIGN PATENT DOCUMENTS

| | | |
|---|---|---|
| JP | 2004-332099 A | 11/2004 |
| JP | 2006-104532 A | 4/2006 |
| JP | 3889768 B2 | 3/2007 |
| JP | 2008-7854 A | 1/2008 |
| JP | 2008-81788 A | 4/2008 |
| JP | 2008-101238 A | 5/2008 |
| JP | 2010-90475 A | 4/2010 |
| JP | 2010-196115 A | 9/2010 |
| JP | 2013-19047 A | 1/2013 |
| WO | WO 2007/142197 A1 | 12/2007 |
| WO | WO 2011/013845 A1 | 2/2011 |
| WO | WO 2012/002520 A1 | 1/2012 |

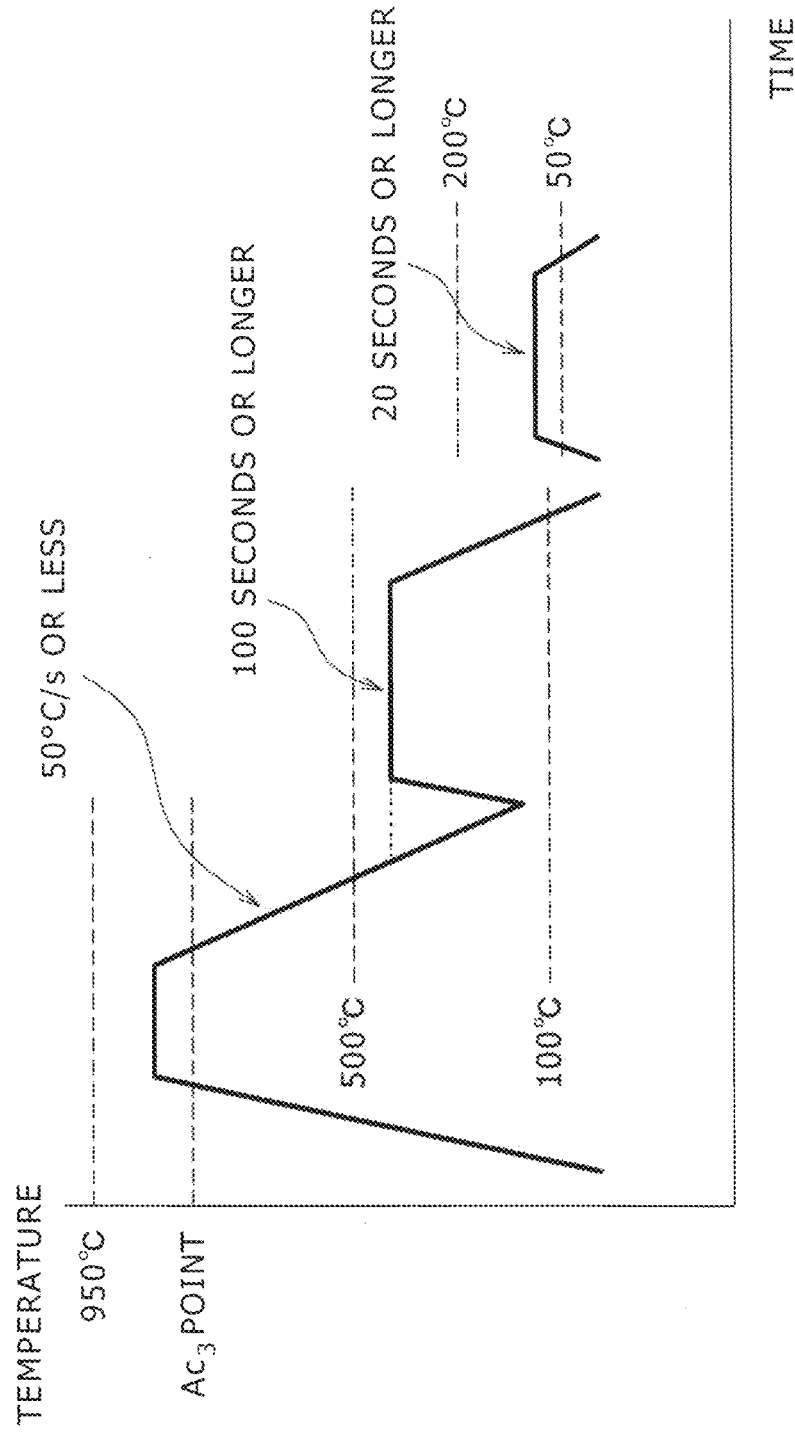

FIG. 3A ×150,000
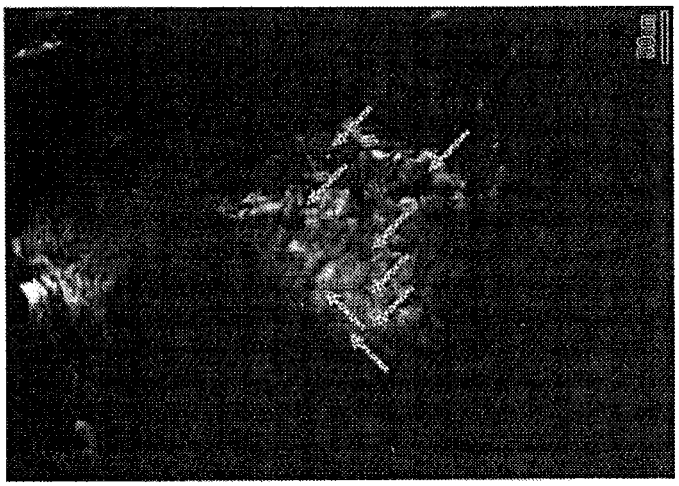
FIG. 3B ×150,000
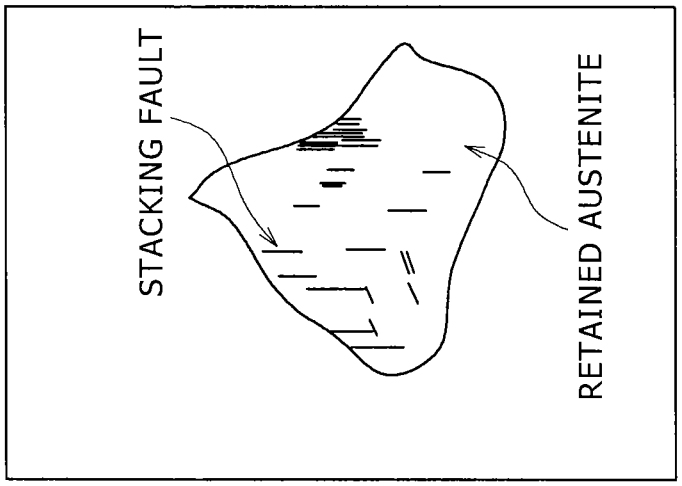
FIG. 3C

HIGH-STRENGTH STEEL SHEET AND METHOD FOR PRODUCING THE SAME

TECHNICAL FIELD

The present invention relates to high-strength steel sheets and production methods thereof. Specifically, the present invention relates to a high-strength steel sheet having a tensile strength in the range of 1180 MPa or more and still having excellent workability and low-temperature toughness, and methods for efficiently producing the steel sheet.

BACKGROUND ART

Automobiles and other transport equipment are demanded to have lighter self weights so as to achieve lower fuel consumption thereof. The lighter weights are effectively achieved typically by reducing the thickness of the equipment using high-strength steel sheets. In addition, the automobiles intensively require crashworthiness. To achieve this, structural parts such as pillars, and reinforcing parts such as bumpers and impact beams require still higher strengths. However, steel sheets, when designed to have higher strengths, have inferior ductility and offer poor workability. The high-strength steel sheets therefore require strength and workability both at satisfactory levels (satisfactory TS×EL balance). Most of automobile steel parts employ steel sheets applied with a zinc coating such as hot-dip galvanized coating (GI), hot-dip galvannealed coating (GA), and electrogalvanized coating (EG) from the viewpoint of corrosion resistance. These steel sheets are hereinafter also representatively referred to as "galvanized steel sheet(s)". For the above reason, the galvanized steel sheets also require properties as with the high-strength steel sheets.

As techniques to provide high-strength steel sheets having strength and workability both at satisfactory levels, some literature proposes as follows. Typically, Patent literature 1 proposes a high-strength steel sheet. This steel sheet includes a microstructure containing a ferrite matrix, and second-phase martensite and retained austenite dispersed in specific proportions in the matrix and has excellent elongation and stretch flangeability.

Patent literature 2 proposes a high-strength cold-rolled steel sheet. This steel sheet has controlled Si and Mn contents, includes a microstructure mainly containing martensite and ferrite and further containing retained austenite, and offers excellent coating adhesion and ductility.

Patent literature 3 proposes a high-strength cold-rolled steel sheet. This steel sheet includes a microstructure containing ferrite, tempered martensite, martensite, and retained austenite and offers excellent workability and shock resistance.

Patent literature 4 proposes a high-strength steel sheet. This steel sheet includes a microstructure containing bainitic ferrite, martensite, and retained austenite, offers excellent ductility and stretch flangeability, and has a high tensile strength of 980 MPa or more.

In particular, recent steel sheets typically for automobiles require not only the proposed strength and workability, but also better safety in an assumed use environment. Typically, the steel sheets are desired to have excellent low-temperature toughness as their properties on the assumption of body collision under low-temperature conditions in the winter. However, such steel sheets, when designed to have higher strengths, tend to have inferior low-temperature toughness. This unfortunately causes the conventional steel sheets to hardly ensure sufficient low-temperature toughness, where the conventional steel sheets are provided so as to have higher strengths and better workability. Demands have therefore been made to provide steel sheets having still better low-temperature toughness.

Citation List

Patent Literature

Patent literature 1: Japanese Unexamined Patent Application Publication No. 2008-101238
Patent literature 2: Japanese Patent No. 3889768
Patent literature 3: Japanese Unexamined Patent Application Publication No. 2010-196115
Patent literature 4: Japanese Unexamined Patent Application Publication No. 2010-90475

SUMMARY OF INVENTION

Technical Problem

The present invention has been made while focusing attention on the circumstances, and it is an object of the present invention to provide a high-strength steel sheet and a production method thereof. In particular, it is an object of the present invention to provide a high-strength steel sheet and a production method thereof, where the high-strength steel sheet has a tensile strength of 1180 MPa or more and offers excellent workability and low-temperature toughness.

Solution to Problem

A high-strength steel sheet according to the present invention can achieve the objects. That is, the steel sheet offers excellent workability and low-temperature toughness, and has a tensile strength of 1180 MPa or more. The steel sheet includes, in a chemical composition, C in a content of 0.10% (in mass percent, hereinafter the same for chemical composition) to 0.30% or less, Si in a content of 1.40% to 3.0%, Mn in a content of 0.5% to 3.0%, P in a content of 0.1% or less (excluding 0%), S in a content of 0.05% or less (excluding 0%), Al in a content of 0.005% to 0.20%, N in a content of 0.01% or less (excluding 0%), and O in a content of 0.01% or less (excluding 0%), with the remainder consisting of iron and inevitable impurities. A microstructure at a position corresponding to one-fourth the thickness of the steel sheet meets all the following conditions (1) to (4).

(1) The microstructure includes ferrite in a volume fraction of 5% to 35% and bainitic ferrite and/or tempered martensite in a volume fraction of 50% or more relative to the entire microstructure, where the volume fractions of ferrite and bainitic ferrite and/or tempered martensite are determined by scanning electron microscopic observation.

(2) The microstructure includes MA constituent in a volume fraction of 20% or less (excluding 0%) relative to the entire microstructure, where the MA constituent is a mixed structure of fresh martensite and retained austenite, and where the volume fraction of the MA constituent is determined by optical microscopic observation.

(3) The microstructure includes retained austenite in a volume fraction of 5% or more relative to the entire microstructure, where the volume fraction of retained austenite is determined by X-ray diffractometry.

(4) The microstructure has an amount of stacking faults in the retained austenite of $10.0 \times 10^3$ (nm/nm$^2$) or less, where the amount is determined by transmission electron microscopic observation The high-strength steel sheet may further include, on or over a surface thereof, an electrogalvanized layer, a hot-dip galvanized layer, or a hot-dip galvannealed layer.

The high-strength steel sheet may further contain at least one element selected from the group consisting of Cr in a content of 1.0% or less (excluding 0%) and Mo in a content of 1.0% or less (excluding 0%) as an additional element or elements.

The high-strength steel sheet may further contain at least one element selected from the group consisting of Ti in a content of 0.15% or less (excluding 0%), Nb in a content of 0.15% or less (excluding 0%), and V in a content of 0.15% or less (excluding 0%) as an additional element or elements.

The high-strength steel sheet may further contain at least one element selected from the group consisting of Cu in a content of 1.0% or less (excluding 0%) and Ni in a content of 1.0% or less (excluding 0%) as an additional element or elements.

The high-strength steel sheet may further contain B in a content of 0.0050% or less (excluding 0%) as an additional element.

The high-strength steel sheet may further contain at least one element selected from the group consisting of Ca in a content of 0.0100% or less (excluding 0%), Mg in a content of 0.0100% or less (excluding 0%), and at least one rare-earth element (REM) in a content of 0.0100% or less (excluding 0%) as an additional element or elements.

The present invention also includes a method for producing the high-strength steel sheet. The method includes preparing a steel sheet having the chemical composition, subjecting the steel sheet sequentially to soaking in a temperature range from ($Ac_1$ point+20° C.) to lower than $Ac_3$ point, cooling down to a temperature range from 100° C. to 500° C. at an average cooling rate of 5° C./second or more, holding in the temperature range from 100° C. to 500° C. for 100 seconds or longer, and cooling down to room temperature, and holding the steel sheet in a temperature range from 50° C. to 200° C. for 20 seconds or longer.

The present invention further includes another method for producing the high-strength steel sheet. The method includes preparing a steel sheet having the chemical composition, sequentially subjecting the steel sheet to soaking in a temperature range from $Ac_3$ point to 950° C., cooling down to a temperature range from 100° C. to 500° C. at an average cooling rate of 50° C./second or less, holding in the temperature range from 100° C. to 500° C. for 100 seconds or longer, and cooling down to room temperature, and holding the steel sheet in a temperature range from 50° C. to 200° C. for 20 seconds or longer.

Advantageous Effects of Invention

The present invention can provide high-strength steel sheets that have a tensile strength of 1180 MPa or more and still have excellent workability and low-temperature toughness. As used herein the term "steel sheet(s)" refers to and includes hot-rolled steel sheets, cold-rolled steel sheets, hot-dip galvanized steel sheets, hot-dip galvannealed steel sheets, and electrogalvanized steel sheets. The high-strength steel sheets according to the present invention have excellent ductility (EL) and offer good balance between strength and ductility (TS×EL balance), where the balance serves as an index for workability. The ductility (EL) and the TS×EL balance are herein also synthetically referred to as "workability". The production methods according to the present invention can efficiently produce the steel sheets.

The high-strength steel sheets according to the present invention are therefore very useful particularly in automobiles and other industrial areas.

As used herein the term "high-strength steel sheets" refers to steel sheets having a tensile strength (TS) of 1180 MPa or more, preferably 1200 MPa or more, and more preferably 1220 MPa or more. The steel sheets may have a ductility (EL) of preferably 12% or more, more preferably 13% or more, and furthermore preferably 14% or more. The steel sheets may have a TS×ET, balance of preferably 15000 (MPa·%) or more, more preferably 16000 (MPa·%) or more, and furthermore preferably 18000 (MPa·%) or more. The TS×EL balance is the balance between the tensile strength and the ductility (elongation). The steel sheets desirably have an absorbed energy at −40° C. of preferably 9 J or more, and more preferably 10 J or more, where the absorbed energy is measured in a Charpy impact test (Japanese Industrial Standard (JIS) Z2224, in 1.4 mm thickness) and indicates low-temperature toughness.

BRIEF DESCRIPTION OF DRAWINGS

FIG. 2 is a schematic explanatory diagram illustrating a heat treatment pattern in a production method according to another embodiment of the present invention; and FIGS. 3A, 3B and 3C are transmission electron photomicrographs and are respectively a bright field image, a dark field image, and a schematic diagram of stacking faults in FIG. 3b, where the arrows in FIG. 3b indicate stacking faults.

DESCRIPTION OF EMBODIMENTS

Figure 1:
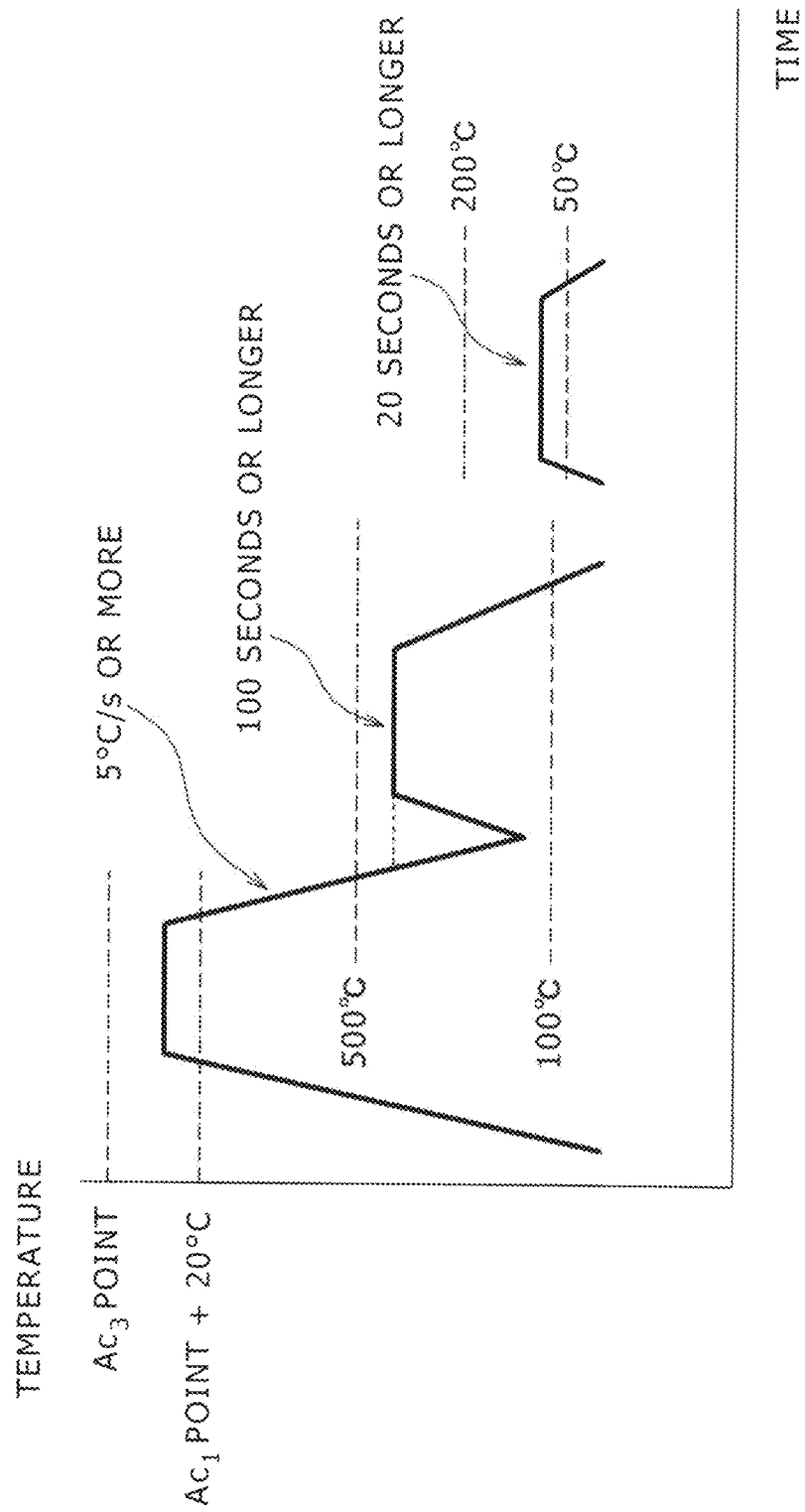
FIG. 1 is a schematic explanatory diagram illustrating a heat treatment pattern in a production method according to an embodiment of the present invention.

The present inventors made intensive investigations to improve workability and low-temperature toughness of high-strength steel sheets having a tensile strength of 1180 MPa or more.

As a result, the present inventors have found a steel sheet that has a high strength and excellent workability and still offers better low-temperature toughness. Specifically, on the assumption of having an appropriately controlled chemical composition, the steel sheet can be obtained by allowing the steel sheet to include a microstructure including ferrite, retained austenite, MA constituents, and at least one of bainitic ferrite and tempered martensite in specific proportions and by controlling stacking faults in the retained austenite to a certain level or less. The retained austenite is hereinafter also simply referred to as "retained γ". The "MA constituent" refers to a mixed phase of fresh martensite and retained austenite (martensite-austenite constituent). The present invention has been made based on these findings.

Reasons for specifying the microstructure herein will be illustrated in detail below. The term "volume fraction" as measured by microscopic observation refers to a percentage (proportion) in the entire microstructure (100%) of the steel sheet. Of phases in the microstructure constituting the steel sheet according to the present invention, the volume fraction of at least one of bainitic ferrite and tempered martensite (matrix) and the volume fraction of ferrite are values as measured at a position corresponding to one-fourth the thickness of the steel sheet by scanning electron microscopic (SEM) observation. The volume fraction of the MA constituent (fresh martensite and retained γ) is a value as measured at a position corresponding to one-fourth the thickness of the steel sheet by optical microscopic observation. The mixed phase of fresh martensite and retained γ is measured as MA constituent, because fresh martensite and retained γ are hardly distinguished from each other by optical microscopic observation. The volume fraction of retained austenite is a value as measured by X-ray diffractometry. Specifically, the measurement method varies from a phase (microstructure) to another. Accordingly, volume fraction of all phases specified in the present invention, when summed up, may exceed 100%. This is because the retained austenite constituting the MA constituent is measured not only by optical microscopic observation, but also by X-ray diffractometry in a partially duplicated manner.

Ferrite volume fraction: 5% to 35%

Ferrite phase effectively contributes to better ductility (EL) of the steel sheet. The steel sheet according to the present invention, as being allowed to have a higher ferrite volume fraction, can have better ductility in a high strength region at a tensile strength of 1180 MPa or more and have better TS×EL balance. To exhibit these effects, the steel sheet may have a ferrite volume fraction of 5% or more, preferably 7% or more, and more preferably 10% or more. However, the steel sheet, if containing ferrite in excess, may have lower strengths and may hardly have a high strength of 1180 MPa or more surely. To prevent this, the steel sheet may have a ferrite volume fraction of 35% or less, preferably 30% or less, and more preferably 25% or less.

Volume fraction of bainitic ferrite and/or tempered martensite (matrix, remainder microstructure): 50% or more The remainder microstructure other than ferrite, MA constituent, and retained austenite as observed by the SEM, optical microscope, or X-ray diffractometry approximately includes at least one of bainitic ferrite and tempered martensite. The term "approximately" refers to that the remainder microstructure may further contain one or more other phases (e.g., pearlite) and basically includes at least one of bainitic ferrite and tempered martensite, where such other phases are inevitably formed during the production process of the steel sheet. The at least one of bainitic ferrite and tempered martensite is a phase acting as a main phase in the microstructure herein (i.e., a phase having a largest volume fraction in the microstructure). The microstructure may include the at least one of bainitic ferrite and tempered martensite in a volume fraction of 50% or more, and preferably 60% or more. In contrast, the microstructure may include the at least one of bainitic ferrite and tempered martensite in a volume fraction of preferably 90% or less, and more preferably 80% or less, from the viewpoint of ductility at certain level. The microstructure may include the other phase or phases than bainitic ferrite and tempered martensite in a volume fraction of preferably about 5% or less (including 0%), where the other phases are inevitably formed and constitute the remainder microstructure. When the microstructure includes both bainitic ferrite and tempered martensite, the term "volume fraction of at least one of bainitic ferrite and tempered martensite" refers to a total volume fraction of them.

The bainitic ferrite and tempered martensite cannot be distinguished from each other and are observed both as fine lathy phases in SEM observation. Accordingly, the present invention specifies these phases as including both of them.

Volume fraction of mixed phase (MA constituent) of fresh martensite and retained austenite: 20% or less (excluding 0%)

As used herein the term "MA constituent" refers to a mixed phase of fresh martensite and retained γ, in which fresh martensite and retained γ cannot be separated (distinguished) from each other by microscopic observation. The term "fresh martensite" refers to a phase that is formed by allowing untransformed austenite to undergo martensite transformation in the process of cooling the steel sheet from the heating temperature down to room temperature. The "fresh martensite" is distinguished from tempered martensite after a heat treatment (austempering). The MA constituent can be identified as appearing white upon etching with a LePera reagent.

The presence of the MA constituent helps the steel sheet to have higher strengths and/or better ductility. To provide better TS×EL balance, the steel sheet may contain the MA constituent in a volume fraction of preferably 3% or more, and more preferably 4% or more. In contrast, the MA constituent also acts as one of factors causing embrittlement, as with stacking faults. When the after-mentioned stacking faults in the retained austenite are present in an amount of $10.0 \times 10^{-3}$ $(nm/nm^2)$ or less, the steel sheet may contain the MA constituent in a volume fraction of up to 20%. In contrast, the steel sheet, if containing the MA constituent in a volume fraction greater than 20%, may have inferior low-temperature toughness caused by the presence of the MA constituent. To prevent this, the steel sheet according to the present invention may contain the MA constituent in a volume fraction of 20% or less, preferably 15% or less, and more preferably 7% or less.

Retained austenite (retained γ) volume fraction: 5% or more

Retained austenite phase deforms and is transformed into martensite upon the application of strain in processing of the steel sheet, thus effectively helps the steel sheet to surely have good ductility. In addition, this phase effectively promotes hardening of a deformed portion and thereby restrains strain concentration upon processing. The phase is therefore necessary for better TS×EL balance of the steel sheet. To exhibit these effects effectively, the steel sheet may contain retained γ in a volume fraction of preferably 5% or more, more preferably 6% or more, and furthermore preferably 7% or more. The upper limit of the retained γ volume fraction is not critical, but is about 16% within the ranges of chemical composition and production conditions as specified according to the present invention.

The retained γ exists in a variety of forms. Typically, the retained γ is present between laths and/or at grain boundaries of bainitic ferrite, and/or is present as included in the MA constituent. The retained γ, however, exhibits its effects regardless of its existence form. Thus, the retained γ within a measurement range is herein measured as retained γ regardless of its existence form.

Stacking faults in retained austenite: $10.0 \times 10^{-3}$ $(nm/nm^2)$ or less Retained austenite having a face-centered cubic (FCC) structure has a low stacking fault energy and is susceptible to stacking fault formation. The stacking faults can cause brittle fracture. The present inventors have focused attention on the stacking faults so as to provide better low-temperature toughness and have made intensive investigations about relationship between the stacking faults and low-temperature toughness. As a result, the present inventors have found that the steel sheet, when controlled to have an amount of stacking faults of $10.0 \times 10^{-3}$ $(nm/nm^2)$ or less, can practically resist brittle fracture and can have better low-temperature toughness, where the stacking fault amount is determined using a transmission electron microscope (TEM) by a method described in after-mentioned experimental examples. The steel sheet may have a stacking fault amount of preferably $5.0 \times 10^{-3}$ $(nm/nm^2)$ or less, and more preferably $3.0 \times 10^{-3}$ $(nm/nm^2)$ or less. The lower limit of the stacking fault amount is about $0.1 \times 10^{-3}$ $(nm/nm^2)$ within ranges of the chemical composition and production conditions in the present invention Next, chemical compositions of the high-strength steel sheet according to the present invention will be described.

C: 0.10% to 0.30%

Carbon (C) element is necessary for the strength of the steel sheet at certain level and better stability of retained γ. To surely have a tensile strength of 1180 MPa or more, the steel sheet may contain carbon in a content of 0.10% or more, preferably 0.12% or more, and more preferably 0.15% or more. However, the steel sheet, if containing carbon in excess, may have an excessively high strength after hot rolling and thereby suffer from cracking upon cold rolling or give a final product with inferior weldability. To prevent this, the steel sheet may contain carbon in a content of 0.30% or less, preferably 0.26% or less, and more preferably 0.23% or less.

Si: 1.40% to 3.0% Silicon (Si) element acts as a solute-strengthening element and contributes to a higher strength of the steel. This element effectively restrains the formation of carbides, effectively contributes to the formation of retained γ, and helps the steel sheet to surely have excellent TS×EL balance. To exhibits the activities effectively, the steel sheet may desirably contain Si in a content of 1.40% or more, preferably 1.50% or more, and more preferably 1.8% or more. However, the steel sheet, if containing Si in excess, may suffer from formation of remarkable scale upon hot rolling to cause scale marks on the surface thereof and thereby have inferior surface quality. In addition, such excessive Si may impair acid wash properties. To prevent these, the steel sheet may contain Si in a content of 3.0% or less, preferably 2.8% or less, and more preferably 2.6% or less.

Mn: 0.5% to 3.0%

Manganese (Mn) element improves hardenability and contributes to a higher strength of the steel sheet. This element also effectively stabilizes austenite to form retained γ. To exhibit such activities effectively, the steel sheet may desirably contain Mn in a content of 0.5% or more, preferably 0.6% or more, more preferably 1.0% or more, and furthermore preferably 1.5% or more. However, the steel sheet, if containing Mn in excess, may have an excessively high strength after hot rolling to cause cracking upon cold rolling or to cause inferior weldability of the final product. In addition, the steel sheet, if containing Mn in excess, may suffer from segregation of Mn to have inferior workability. To prevent these, the steel sheet may contain Mn in a content of 3.0% or less, preferably 2.8% or less, and more preferably 2.6% or less.

P: 0.1% or less (excluding 0%) Phosphorus (P) element is contained inevitably in the steel sheet and causes the steel sheet to have inferior weldability. To prevent this, the steel sheet may contain phosphorus in a content of 0.1% or less, preferably 0.08% or less, and more preferably 0.05% or less. The phosphorus content is preferably minimized and is not critical in terms of lower limit.

S: 0.05% or less (excluding 0%).

Sulfur (S) element is contained inevitably in the steel sheet and causes the steel sheet to have inferior weldability, as with phosphorus (P). In addition, sulfur forms sulfide inclusions in the steel sheet and thereby causes the steel sheet to have inferior workability. To prevent these, the steel sheet may contain sulfur in a content of 0.05% or less, preferably 0.01% or less, and more preferably 0.005% or less. The sulfur content is preferably minimized and is not critical in terms of lower limit.

Al: 0.005% to 0.20%

Aluminum (Al) element acts as a deoxidizer. To exhibit such activities effectively, the steel sheet may desirably contain Al in a content of 0.005% or more, and more preferably 0.010% or more. However, the steel sheet, if containing Al in excess, may have remarkably inferior weldability. To prevent this, the steel sheet may contain Al in a content of 0.20% or less, preferably 0.15% or less, and more preferably 0.10% or less.

N: 0.01% or less (excluding 0%) Nitrogen (N) element is inevitably contained in the steel sheet, but forms nitrides therein to contribute to a higher strength of the steel sheet. From this viewpoint, the steel sheet preferably contains nitrogen in a content of 0.0010% or more. However, the steel sheet, if containing nitrogen in excess, may suffer from the formation of large amounts of nitrides and suffer from deterioration typically in elongation, stretch flangeability (λ), and bendability. To prevent this, the steel sheet may contain nitrogen in a content of 0.01% or less, preferably 0.008% or less, and more preferably 0.005% or less.

O: 0.01% or less (excluding 0%)

Oxygen (O) element is inevitably contained in the steel sheet and, if contained in excess, causes the steel sheet to suffer from deterioration in ductility and bendability upon processing. To prevent this, the steel sheet may contain oxygen in a content of 0.01% or less, preferably 0.005% or less, and more preferably 0.003% or less. The oxygen content is preferably minimized and is not critical in terms of lower limit.

The steel sheet according to the present invention has a chemical composition meeting the above-mentioned conditions, with the remainder consisting of iron and inevitable impurities. The inevitable impurities may typically include the above-mentioned elements, i.e., P, S, N, and O, and tramp elements such as Pb, Bi, Sb, and Sn. These elements may be brought into the steel under certain circumstances of raw materials, facility materials, and production facilities. The steel sheet can also positively contain one or more of following elements as an additional element or elements, within ranges not adversely affecting the operations of the present invention.

The steel sheets according to the present invention may further contain, as an additional element or elements, at least one element selected from the group consisting of:

(A) at least one element selected from the group consisting of Cr in a content of 1.0% or less (excluding 0%) and Mo in a content of 1.0% or less (excluding 0%);

(B) at least one element selected from the group consisting of Ti in a content of 0.15% or less (excluding 0%), Nb in a content of 0.15% or less (excluding 0%), and vanadium (V) in a content of 0.15% or less (excluding 0%);

(C) at least one element selected from the group consisting of Cu in a content of 1.0% or less (excluding 0%) and Ni in a content of 1.0% or less (excluding 0%);

(D) B in a content of 0.0050% or less (excluding 0%); and (E) at least one element selected from the group consisting of Ca in a content of 0.0100% or less (excluding 0%), Mg in a content of 0.0100% or less (excluding 0%), and at least one rare-earth element (REM) in a content of 0.0100% or less (excluding 0%). The steel sheet may contain each of the groups (A) to (E) of elements alone or in any combination. The ranges of contents are specified for reasons as follows.

(A) At least one element selected from the group consisting of Cr in a content of 1.0% or less (excluding 0%), and Mo in a content of 1.0% or less (excluding 0%)

Chromium (Cr) and molybdenum (Mo) elements each effectively improve hardenability and help the steel sheet to have a higher strength. The steel sheet may contain each of these elements alone or in combination.

To exhibit the above-mentioned activities effectively, the steel sheet may contain Cr and/or Mo each in a content of preferably 0.1% or more, and more preferably 0.3% or more.

However, the steel sheet, if containing at least one of these elements in excess, may have inferior workability and be of high cost. To prevent this, the steel sheet may contain, in the case of a single use, one of these elements in a content of preferably 1.0% or less, more preferably 0.8% or less, and furthermore preferably 0.5% or less. The steel sheet, when containing both of Cr and Mo, preferably contains these elements in contents each equal to or less than the upper limit and in a total content of 1.5% or less.

(B) At least one element selected from the group consisting of Ti in a content of 0.15% or less (excluding 0%), Nb in a content of 0.15% or less (excluding 0%), and vanadium (V) in a content of 0.15% or less (excluding 0%)

Titanium (Ti), niobium (Nb), and vanadium (V) elements each form precipitates of carbides and/or nitrides in the steel sheet to help the steel sheet to have a higher strength and contribute to the refinement of prior austenite grains. The steel sheet may contain each of these elements alone or in combination. To exhibit the above-mentioned activities effectively, the steel sheet may contain one or more of Ti, Nb, and V each in a content of preferably 0.005% or more, and more preferably 0.010% or more. However, the steel sheet, if containing these elements each in excess, may suffer from the precipitation of carbides at the grain boundaries and suffer from deterioration in stretch flangeability and/or bendability. To prevent this, the steel sheet may contain one or more of Ti, Nb, and V each in a content of preferably 0.15% or less, more preferably 0.12% or less, and furthermore preferably 0.10% or less.

(C) At least one element selected from the group consisting of Cu in a content of 1.0% or less (excluding 0%) and Ni in a content of 1.0% or less (excluding 0%)

Copper (Cu) and nickel (Ni) elements effectively contribute to the formation and stabilization of retained austenite and effectively help the steel sheet to have better corrosion resistance. The steel sheet may contain each of these elements alone or in combination. To exhibit the above-mentioned activities, the steel sheet may contain one or both of Cu and Ni each in a content of preferably 0.05% or more, and more preferably 0.10% or more. However, the steel sheet, if containing Cu in excess, may have inferior hot workability. To prevent this, the steel sheet, when containing Cu alone, may contain Cu in a content of preferably 1.0% or less, more preferably 0.8% or less, and furthermore preferably 0.5% or less. The steel sheet, if containing Ni in excess, may invite high cost. To prevent this, the steel sheet may contain Ni in a content of preferably 1.0% or less, more preferably 0.8% or less, and furthermore preferably 0.5% or less. The steel sheet, if containing both Cu and Ni, may more easily exhibit the activities. In addition, the presence of Ni may restrain hot workability deterioration caused by Cu. For these reasons, the steel sheet may preferably contain both Cu and Ni in combination. In this case, the steel sheet may contain Cu and Ni in a total content of preferably 1.5% or less, and more preferably 1.0% or less.

(D) B in a content of 0.0050% or less (excluding 0%)

Boron (B) element improves hardenability and effectively helps austenite to stably exist at temperatures down to room temperature. To exhibit the such activities effectively, the steel sheet may contain boron in a content of preferably 0.0005% or more, more preferably 0.0010% or more, and furthermore preferably 0.0015% or more. However, the steel sheet, if containing boron in excess, may suffer from the formation of borides to have inferior ductility. To prevent this, the steel sheet may contain boron in a content of preferably 0.0050% or less, more preferably 0.0040% or less, and furthermore preferably 0.0035% or less.

(E) At least one element selected from the group consisting of Ca in a content of 0.0100% or less (excluding 0%), Mg in a content of 0.0100% or less (excluding 0%), and at least one rare-earth element (REM) in a content of 0.0100% or less (excluding 0%)

Calcium (Ca), magnesium (Mg), and rare-earth elements (REMs) function so as to allow inclusions to finely disperse in the steel sheet. The steel sheet may contain each of these elements alone or in combination of two or more elements as optionally selected. To exhibit the above-mentioned activities effectively, the steel sheet may contain one or more of Ca, Mg, and REM each in a content of preferably 0.0005% or more, and more preferably 0.0010% or more. However, the steel sheet, if containing any of these elements in excess, may have inferior castability and/or hot workability. To prevent this, the steel sheet may contain one or more of Ca, Mg, and REM each in a content of preferably 0.0100% or less, more preferably 0.0080% or less, and furthermore preferably 0.0070% or less.

As used herein the term "rare-earth element(s) (REM(s))" refers to and includes Sc (scandium) and Y (yttrium) as well as lanthanoid elements including fifteen elements from La (lanthanum) to Lu (lutetium).

Next, methods for producing the high-strength steel sheet according to the present invention will be illustrated. Initially, a steel having a chemical composition meeting the above conditions is subjected to hot rolling and, as needed, to cold rolling according to common procedures to give a steel sheet. The steel sheet is then subjected to the after-mentioned annealing and, as needed, to any one or any appropriate combination of hot-dip galvanizing treatment, alloying treatment, and electrogalvanizing treatment. In this process, the production methods according to the present invention control the annealing process to give a high-strength steel sheet including a desired microstructure.

Typically, a steel having the chemical composition is prepared and is subjected to hot rolling and, as needed, cold rolling according to common procedures. The hot rolling may be performed typically at a finish rolling temperature approximately equal to or higher than $Ac_3$ point and at a coiling temperature of about 400° C. to about 700° C. Where necessary, the steel sheet after the hot rolling is subjected to acid wash and cold rolling typically with a cold rolling reduction of about 30% to about 80%.

The present invention specifies production methods (I) and (II) using the hot-rolled steel sheet or cold-rolled steel sheet. The production methods (I) and (II) respectively include annealing processes as follows.

The production method (I) includes the annealing process including steps 1 and 2 as illustrated in FIG. 1. In the step 1, the steel sheet is sequentially subjected to soaking in a temperature range from ($Ac_1$ point+20° C.) to lower than $Ac_3$ point, cooling down to a temperature range from 100° C. to 500° C. at an average cooling rate of 5° C./second or more, holding in the temperature range from 100° C. to 500° C. for 100 seconds or longer, and cooling down to mom temperature. In the step 2, the steel sheet is held in a temperature range from 50° C. to 200° C. for 20 seconds or longer.

The production method (1) includes the annealing process including the steps 1 and 2 as illustrated in FIG. 2. In the step 1, the steel sheet is sequentially subjected to soaking in a temperature range from $Ac_3$ point to 950° C., cooling down to a temperature range from 100° C. to 500° C. at an average cooling rate of 50° C./second or less, holding in the temperature range from 100° C. to 500° C. for 100 seconds or longer, and cooling down to room temperature. In the step 2, the steel sheet is held in a temperature range from 50° C. to 200° C. for 20 seconds or longer.

Reasons for specifying conditions of the annealing processes will be described in detail below.

In the step 1 of the production method (I), the steel sheet is subjected to soaking at a temperature in the range from ($Ac_1$ point+20° C.) to lower than $Ac_3$ point and, after soaking, cooled down to a temperature range from 100° C. to 500° C. at an average cooling rate of 5° C./second or more.

In the production method (I), the ferrite amount (ferrite volume fraction) may be controlled by any of first and second processes as follows.

In the first process, the steel sheet is soaked at a temperature in a dual phase region of from ($Ac_1$ point+20° C.) to lower than $Ac_3$ point (preferably a temperature near to ($Ac_1$ point+20° C.)) to ensure ferrite in a specific amount, whereas the steel sheet after the soaking is cooled down to a temperature range from 100° C. to 500° C. at a relatively high average cooling rate of 5° C./second or more so as not to allow the ferrite to form more than necessary.

In the second process, the steel sheet is soaked in the dual phase region to include part of the desired amount of ferrite, whereas the steel sheet after the soaking is cooled down to a temperature range from 100° C. to 500° C. at a relatively low average cooling rate, i.e., at an average cooling rate near to its lower limit of 5° C./second so as to allow ferrite also grow during the cooling process to ensure the desired amount of ferrite.

The soaking, if performed at a temperature lower than ($Ac_1$ point+20° C.), may cause the final steel sheet to include an excessively large amount of ferrite in the microstructure to thereby fail to surely have a sufficient strength. In contrast, the soaking, if performed at a temperature higher than $Ac_3$ point, may fail to allow ferrite to sufficiently form and grow during the soaking. Thus, the steel sheet hardly ensures a sufficient amount of ferrite when cooling is performed at the average cooling rate mentioned below. The resulting steel sheet may hardly include a predetermined amount of ferrite as a result of the soaking-cooling process.

The soaking, when performed at a temperature in the dual phase region of from ($Ac_1$ point+20° C.) to lower than $Ac_3$ point (preferably at a temperature near to ($Ac_1$ point+20° C.)), may allow carbon and manganese in ferrite to migrate into, and be enriched in, austenite, thereby accelerate the formation of carbon-enriched retained austenite, and allow the steel sheet still to be improved in properties such as ductility.

After the soaking in the dual phase region, the cooling rate from the soaking temperature is controlled so as to control the amount of formed/grown ferrite. In particular, ferrite is formed during the soaking, and the cooling is performed at a high cooling rate so as to restrain further formation and growth of ferrite. Specifically, the cooling from the soaking temperature down to the temperature range from 100° C. to 500° C. is performed at an average cooling rate of 5° C./second or more. The cooling, if performed at an average cooling rate of less than 5° C./second, may cause the steel sheet to include an excessively large amount of ferrite and to fail to surely have a strength of 1180 MPa or more. The cooling may be performed at an average cooling rate of preferably 7° C./second or more, and more preferably 10° C./second or more. The upper limit of the average cooling rate is not critical. The cooling may be performed typically by water cooling or oil cooling.

In the step 1 of the production method (II), the steel sheet is sequentially subjected to soaking at a temperature in the range from $Ac_3$ point to 950° C. and cooling down to a temperature range from 100° C. to 500° C. at an average cooling rate of 50° C./second or less.

In the production method (II), ferrite does not form during the soaking in the single-phase region of $Ac_3$ point or higher, but form and grow during the subsequent cooling process as performed at a controlled average cooling rate so as to allow the steel sheet to include a specific amount of ferrite. The soaking, if performed at an excessively high temperature, may cause the steel sheet to include a layer enriched with Si and/or Mn in the surface layer and to have inferior surface treatment properties. To prevent this, the soaking may be performed at a temperature of 950° C. or lower, and preferably 920° C. or lower.

After the soaking in the single-phase region, cooling from the soaking temperature is performed at a controlled cooling rate to allow ferrite to form and grow so as to control the ferrite amount, as described above. In particular, ferrite does not form during the soaking, and the cooling is thereby performed at a low cooling rate so as to allow ferrite to form and grow during the cooling. Specifically, the cooling from the soaking temperature down to the temperature range from 100° C. to 500° C. is performed at an average cooling rate of 50° C./second or less. The cooling, if performed at an average cooling rate greater than 50° C./second, may fail to allow ferrite to form during the cooling and may fail to allow the steel sheet to surely have ductility. To accelerate the formation and growth of ferrite during the cooling process, the cooling may be performed at an average cooling rate of preferably 45° C./second or less, and more preferably 40° C./second or less. Though not critical, the lower limit of the average cooling rate is preferably 1° C./second or more, more preferably 5° C./second or more so as to restrain the formation and growth of excessive ferrite during the cooling process.

In the step 1 of both the production methods (I) and (II), the cooling after the soaking is stopped at a temperature (cooling stop temperature) in the range from 100° C. to 500° C.

In both the production methods (I) and (II), the soaking and cooling process allows ferrite to form in a specific amount, as described above. The cooling is stopped at a temperature (cooling stop temperature) in the range from 100° C. to 500° C. The cooling, if stopped at a temperature lower than 100° C., may cause most of untransformed austenite to be transformed into martensite and may cause the steel sheet to fail to surely have ductility. To prevent this, the cooling may be stopped at a temperature of preferably 120° C. or higher, and more preferably 150° C. or higher. In contrast, the cooling, if stopped at a temperature higher than 500° C., may cause the steel sheet to hardly have a strength at certain level, to include excessive MA constituents, and to have inferior low-temperature toughness. To prevent this, the cooling may be stopped at a temperature of preferably 400° C. or lower, and more preferably 300° C. or lower.

In the step 1 of both the production methods (I) and (II), the steel sheet is raised in temperature up to the soaking temperature at an average rate of temperature rise as follows.

The average rate of temperature rise up to the soaking temperature is not critical, can be selected as appropriate, and may typically from about 0.5° C./second to about 50° C./second.

In the step 1 of both the production methods (I) and (II), the steel sheet is held at the soaking temperature for a time (soaking holding time) as follows.

Specifically, the holding at the soaking temperature may be performed for a time not critical. However, the holding, if performed for an excessively short time, may cause a deformation structure to remain and may cause the steel to have inferior ductility. To prevent this, the holding may be performed for a time of preferably 80 seconds or longer.

In the step 1 of both the production methods (I) and (II), the steel sheet is held in the temperature range from 100° C. to 500° C. for 100 seconds or longer. This process is austempering.

Specifically, after the cooling, the steel sheet is held in the temperature range from 100° C. to 500° C. for 100 seconds or longer. This process is performed so as to temper martensite, to allow untransformed austenite to be transformed into bainitic ferrite, and to ensure a sufficient amount of retained austenite that is necessary for better elongation properties. The holding, if performed at a temperature (austempering temperature) lower than 100° C., may fail to allow austempering to proceed sufficiently. This may cause the steel sheet to fail to include 5% or more of retained austenite. The holding may be performed at a temperature of preferably 200° C. or higher, and more preferably 250° C. or higher. In contrast, the holding, if performed at a temperature higher than 500° C., may cause the steel sheet to fail to have a high strength. To prevent this, the holding may be performed at a temperature of 500° C. or lower, preferably 470° C. or lower, and more preferably 450° C. or lower.

The holding in the holding temperature range, if performed for an excessively short time (austempering time), may cause insufficient martensite tempering and insufficient untransformed austenite transformation into bainitic ferrite. This may cause the at least one of bainitic ferrite and tempered martensite to constitute the matrix and may cause the steel sheet to contain excess MA constituents and to have inferior low-temperature toughness. To prevent this, the holding in the holding temperature range may be performed for a time of 100 seconds or longer, preferably 150 seconds or longer, and more preferably 200 seconds or longer. The holding time is not critical in terms of upper limit. However, the holding, if performed for an excessively long time, may cause inferior productivity and may cause the precipitation of solute carbon to impede the formation of retained γ. To prevent this, the holding may be performed for a time of preferably 1500 seconds or shorter, and more preferably 1000 seconds or shorter.

After the austempering, the steel sheet is cooled down to room temperature. This cooling may be performed at an average cooling rate not critical, but typically from 0.4° C./second to 200° C./second.

In an embodiment, the final product is a hot-rolled steel sheet or a cold-rolled steel sheet. In this embodiment, the after-mentioned step 2 may be performed directly after the step 1 or after another step subsequent to the step 1 in each of the production methods (I) and (ID. In another embodiment, the final product is an electrogalvanized steel sheet. In this embodiment, each of the production methods (I) and (II) may include the step 1, the step 2, and electrogalvanizing in this order, or may include the step 1 and electrogalvanizing in this order, where the electrogalvanizing also acts as the step 2, as described in the after-mentioned experimental examples; or may include the step 1, electrogalvanizing, and the step 2 in this order.

In yet another embodiment, the final product is a hot-dip galvanized steel sheet or a hot-dip galvannealed steel sheet. In this embodiment, each of the production methods (I) and (II) preferably includes (performs) the step 1, the coating treatment (and an alloying treatment performed as needed), and the step 2 in this order. This is preferred to obtain sufficient effects of reheating in the step 2. The coating treatment and the alloying treatment will be described in detail later.

The step 2 in the production methods (I) and (II) is a reheating step. The reheating step is the step of holding the steel sheet in a temperature range from 50° C. to 200° C. for 20 seconds or longer.

The reheating is performed in the temperature range (reheating temperature) from 50° C. to 200° C. for 20 seconds or longer. This can reduce stacking faults in the retained austenite. The reheating, if performed at a temperature lower than 50° C., may less effectively reduce stacking faults. To prevent this, the reheating may be performed at a temperature of 50° C. or higher, preferably 60° C. or higher, and more preferably 80° C. or higher. In contrast, the reheating, if performed at a temperature higher than 200° C., may cause the steel to have a lower strength To prevent this, the reheating may be performed at a temperature of 200° C. or lower, preferably 150° C. or lower, and more preferably 100° C. or lower.

The holding (reheating) in the temperature range, if performed for a time shorter than 20 seconds, may less effectively reduce stacking faults. To prevent this, the reheating may be performed for a time of 20 seconds or longer, preferably 30 seconds or longer, more preferably 50 seconds or longer, and furthermore preferably 80 seconds or longer. In contrast, the reheating, if performed for an excessively long time, may cause the steel sheet to have a lower strength. To prevent this, the reheating may be performed for a time of preferably 10000 seconds or shorter, and more preferably 5000 seconds or shorter.

The reheating, i.e., holding in the range from 50° C. to 200° C. for 20 seconds or longer, is not limited, as long as the thermal hysteresis of the high-strength steel sheet according to the present invention meets the conditions in temperature and time of the reheating. Specifically, the reheating may be a such process or treatment as to allow the thermal hysteresis of the steel sheet to meet the conditions in temperature and time of the reheating, where the process or treatment is performed as a step or process in which the steel sheet is inevitably raised in temperature. The process or step is exemplified by acid wash, electroplating, a special chemical conversion treatment, and coating (painting) each for surface conditioning.

The temperature rise from room temperature up to the reheating temperature may be performed at an average rate of temperature rise not critical, selectable as appropriate, but typically from about 0.5° C./second to about 10° C./second. The cooling from the reheating temperature down to room temperature may be performed at an average cooling rate also not critical and selectable as appropriate. The cooling may be performed as natural cooling (radiation cooling).

In the present invention, "holding in a predetermined temperature range" may be performed not necessarily at the same temperature, but may be performed at temperatures varying within the predetermined temperature range. Typically, in an embodiment, the steel sheet is cooled down to the cooling stop temperature and then held in the temperature range from 100° C. to 500° C. In this embodiment, the steel sheet may be held at a temperature that is constant or varies within the range from 100° C. to 500° C. The cooling stop temperature and the austempering temperature both fall within the same temperature range. Accordingly, the cooling stop temperature and the temperature of the subsequent austempering may be the same, as illustrated by a dotted line in FIGS. 1 and 2. Specifically, as long as the cooling stop temperature falls within the austempering holding temperature (from 100° C. to 500° C.) range, the steel sheet may be held for a predetermined time as intact without heating (or cooling), or may be held for a predetermined time after heating (or cooling) within the temperature range. The heating from the cooling stop temperature may be performed at an average rate of temperature rise not critical, but typically from about 0° C./second to about 10° C./second.

The $Ac_1$ point and the $Ac_3$ point can be calculated according to Formulae (a) and (b) below, as described in "The Physical Metallurgy of Steels", William C. Leslie (Maruzen Co., Ltd., published on May 31, 1985, p. 273). In the formulae, the numbers in the brackets represent contents (in mass percent) of individual elements.

The calculation may be performed while setting the content of an element not contained in the steel sheet as 0%.

$$Ac_1(°C.)=723-10.7\times[Mn]-16.9\times[Ni]+29.1\times[Si]+16.9\times[Cr]+290\times[As]+6.38\times[W] \quad (a)$$

$$Ac_3(°C.)=910-203\times[C]^{1/2}-15.2\times[Ni]+44.7\times[Si]+104\times[V]+31.5\times[Mo]+13.1\times[W]-(30\times[Mn]+11\times[Cr]+20\times[Cu]-700\times[P]-400\times[Al]-120\times[As]-400\times[Ti]) \quad (b)$$

The final product steel sheet may bear, on its surface, any of an electrogalvanized layer (EG), a hot-dip galvanized layer (GI), and a hot-dip galvannealed layer (GA). Specifically, the present invention can be applied to, and exhibit advantageous effects on, any of steel sheets as follows. The steel sheets are exemplified by hot-rolled steel sheets; cold-rolled steel sheets; galvanized steel sheets (GI steel sheets) including hot-rolled-sheet-based hot-dip galvanized steel sheets as hot-rolled steel sheets that have undergone hot-dip galvanization, and cold-rolled-sheet-based hot-dip galvanized steel sheets (GI steel sheets) as cold-rolled steel sheets that have undergone hot-dip galvanization; hot-dip galvannealed steel sheets (GA steel sheets) that are produced by subjecting the steel sheets after the hot-dip galvanization to an alloying treatment; and electrogalvanized steel sheets (EG steel sheets) including hot-rolled-sheet-based electrogalvanized steel sheets as hot-rolled steel sheets that have undergone electrogalvanization, and cold-rolled-sheet-based electrogalvanized steel sheets (EG steel sheets) as cold-rolled steel sheets that have undergone electrogalvanization.

The electrogalvanized layer, hot-dip galvanized layer, or hot-dip galvannealed layer may be formed by any technique not critical, such as electrogalvanizing treatment, hot-dip galvanizing treatment, and alloying treatment each according to a common procedure. Typically, in an embodiment, an electrogalvanized steel sheet is produced. In this embodiment, the electrogalvanized layer may be formed typically by an electrogalvanizing treatment of applying electricity to the steel sheet while immersing the steel sheet in a zinc solution at 55° C. In another embodiment, a hot-dip galvanized steel sheet is produced. In this embodiment, the hot-dip galvanized layer may be formed typically by immersing the steel sheet in a plating bath controlled at a temperature from about 430° C. to 500° C. to perform hot-dip galvanization and then cooling the steel sheet. In yet another embodiment, a hot-dip galvannealed steel sheet is produced. In this embodiment, the hot-dip galvannealed layer may be formed typically by performing the hot-dip galvanization, heating the resulting steel sheet to a temperature from about 500° C. to about 750° C., alloying the heated steel sheet, and then cooling the same.

The mass of coating per one surface is not critical, but may be from about 10 to about 100 g/m² for an electrogalvanized steel sheet, and from about 10 to about 100 g/m² for a hot-dip galvanized steel sheet.

The technology according to the present invention is advantageously applicable typically to thin steel sheets having a thickness of 6 mm or less.

The present application claims priority to Japanese Patent Application No. 2012-271792 filed on Dec. 12, 2012, the entire contents of which are incorporated herein by reference.

EXAMPLES

The present invention will be illustrated in further detail with reference to several examples (experimental examples) below. It should be noted, however, that the examples are by no means intended to limit the scope of the invention; that various changes and modifications can naturally be made therein without deviating from the spirit and scope of the invention as described herein; and all such changes and modifications should be considered to be within the scope of the invention.

Steels having chemical compositions given in Table 1 below were prepared by vacuum ingot-making, from which slabs for testing were produced. For the chemical compositions in Table 1, the remainder consists of iron and inevitable impurities, and blank fields in Table 1 indicate that an element in question is not added. Table 1 also indicates the $Ac_1$ point and the $Ac_3$ point. Underlined numerical values in Table 1 and after-mentioned Tables 2 to 7 indicate that the value in question is out of the specified range, or the property in question does not meet an acceptance criterion. The slabs were subjected sequentially to hot rolling, cold rolling, and continuous annealing in this order under conditions mentioned below and yielded cold-rolled steel sheets having a thickness of 1.4 mm.

Hot Rolling

The slabs were heated up to 1250° C., held at the temperature for 30 minutes, subjected to hot rolling with a rolling reduction of 90% at a finish rolling temperature of 920° C., cooled down from that temperature down to a coiling temperature of 500° C. at an average cooling rate of 30° C./second, and coiled. After being coiled, the work pieces were held at the coiling temperature (500° C.) for 30 minutes, next, cooled in the furnace down to room temperature, and yielded hot-rolled steel sheets having a thickness of 2.6 mm.

Cold Rolling

The resulting hot-rolled steel sheets were acid-washed to remove surface scale, cold-rolled with a cold rolling reduction of 46%, and yielded cold-rolled steel sheets having a thickness of 1.4 mm.

Annealing of Cold-Rolled Steel Sheets (CRs)

The steel sheets after cold rolling were subjected sequentially to soaking, cooling, austempering, cooling, and reheating in this order under conditions given in Tables 2 to 4 and yielded steel test samples. In the "production method" in Tables 2 to 4, samples produced by the production method (I) or those produced by a method corresponding to production method (I), except for one or more conditions being out of the specified conditions, are indicated with 'I'; and samples produced by the production method (II) or those produced by a method corresponding to the production method (II), except for one or more conductions being out of the specified conditions, are indicated with "II".

In the tables, the temperature at which soaking was performed is indicated in "soaking temperature (° C.)". Likewise, the cooling rate after soaking down to the cooling stop temperature is indicated in "average cooling rate 1 (° C./s)". The cooling stop temperature is indicated in "cooling stop temperature (° C.)". The rate of temperature rise from the cooling stop temperature up to the austempering temperature is indicated in "average rate of temperature rise (° C./s)". The austempering temperature range is indicated in "austempering temperature (° C.)". The holding time (second) in the austempering temperature range is indicated in "austempering time (s)". The cooling rate from the austempering temperature down to room temperature is indicated in "average cooling rate 2 (T/s)". The heating temperature in the reheating step is indicated in "reheating temperature (° C.)". The holding time (second) at the reheating temperature is indicated in "reheating time (s)". In this experimental example, the holding time at the soaking temperature was set within the range from 100 seconds to 600 seconds. After the reheating, the samples were cooled down to room temperature and yielded cold-rolled steel sheets.

Annealing of Electrogalvanized Steel Sheets (EGs)

The steel sheets after cold rolling were subjected sequentially to soaking, cooling, and austempering in this order under conditions given in Tables 2 to 4, cooled down to room temperature, immersed in a zinc plating bath at 55° C. for reheating and electroplating treatment (at a current density of 30 to 50 A/dm$^2$), washed with water, dried, and yielded electrogalvanized steel sheets having a mass of zinc coating of 10 to 100 g/m$^2$ per one surface.

Annealing of Hot-Dip Galvanized Steel Sheets (GIs)

The steel sheets after cold rolling were subjected sequentially to soaking, cooling, and austempering in this order under conditions given in Table 2, immersed in a zinc plating bath at 450° C. for coating treatment, and cooled down to room temperature. The steel sheets were then reheated under conditions given in Table 2, cooled down to room temperature, and yielded hot-dip galvanized steel sheets having a mass of zinc coating of 10 to 100 g/m$^2$ per one surface.

Annealing of Hot-Dip Galvannealed Steel Sheets (GAs)

The steel sheets after cold rolling were subjected sequentially to soaking, cooling, and austempering in this order under conditions given in Tables 2 to 4, immersed in a zinc plating bath at 450° C. for coating treatment, further subjected to alloying treatment at 550° C., and cooled down to room temperature. The steel sheets were then reheated under conditions given in Tables 2 to 4, cooled down to room temperature, and yielded hot-dip galvannealed steel sheets (GA).

In the coating treatments, a washing treatment was performed as appropriate. The washing treatment is exemplified by degreasing by alkaline aqueous solution immersion, water washing, and acid wash.

Each of the steel test samples was subjected to microstructure measurement, mechanical properties evaluation, and low-temperature toughness evaluation as illustrated in detail below.

Microstructure Measurement

The ferrite volume fraction, MA constituent volume fraction, remainder microstructure (at least one of bainitic ferrite and tempered martensite) were measured or determined according to procedures as follows. The "MA constituent" refers to a mixed phase of fresh martensite and retained austenite.

Specifically, a sample steel sheet after annealing was polished in its cross section, etched in the following manner, and observed at a position corresponding to one-fourth the thickness using an optical microscope or a scanning electron microscope (SEM). Photos (photomicrographs) were taken using the optical microscope or SEM and subjected to image analysis to measure the volume fractions of individual phases. The procedures will be illustrated in detail below.

Ferrite Volume Fraction

After the polishing, the test sample was etched with a Nital solution, observed in three fields-of-view using the SEM at 1000-fold magnification, where each field-of-view had a size of 100 μm by 100 μm. Volume fractions of ferrite were measured by point counting at a grid spacing of 5 μm in a number of grid points of 20×20, and the measured values in the three fields-of-view were averaged. The average is indicated in "ferrite (vol. %)" in the tables.

Volume Fraction of MA Constituent (Mixed Phase of Fresh Martensite and Retained Austenite)

After the polishing, the test sample was etched with a LePera reagent and observed in three fields-of-view using an optical microscope at 1000-fold magnification, where each of the three fields-of-view had a size of 100 μm by 100 μm. Volume fractions of MA constituents were measured by point counting at a grid spacing of 5 μm in a number of grid points of 20×20, and the measured values in the three fields-of-view were averaged. The average is indicated in "MA (vol. %)" in the tables. A portion appearing white as a result of the LePera etching was observed as MA constituent.

Volume Fraction of Remainder Microstructure (Bainitic Ferrite and/or Tempered Martensite)

The remainder microstructure was also observed and found to be at least one of bainitic ferrite and tempered martensite. Accordingly, the volume fraction of at least one of bainitic ferrite and tempered martensite was determined by subtracting the ferrite volume fraction and the MA constituent volume fraction from 100%. The resulting volume fraction is indicated in "bainitic ferrite/tempered martensite (vol. %)" in the tables.

The retained austenite volume fraction and the amount of stacking faults in the retained austenite were measured individually in manners as follows.

Retained Austenite (Retained γ) Volume Fraction

The sample was polished to a position one-fourth the thickness using sandpapers of # (count) 1000 to # (count) 1500, the surface of which was further electropolished to a depth of about 10 to about 20 μm, and the volume fraction of retained austenite was measured using an X-ray diffractometer (RINT 1500, supplied by Rigaku Corporation). Specifically, the measurement was performed at 2θ in the range from 40° to 130° using a cobalt (Co) target at an output of about 40 kV and about 200 mA, and retained γ was quantitatively measured based on the measured (110), (200), and (211) bcc (α) diffraction peaks, and on (111), (200), (220), and (311) fcc (γ) diffraction peaks. The measured retained austenite volume fraction is indicated in "γ (vol. %)" in the tables.

Stacking Faults in Retained Austenite

According to an operational procedure below, a billet of 10 mm by 10 mm by 1.4 mm was cut out from a sample steel sheet, polished until a position corresponding to one-fourth the sheet thickness had a thickness of 0.1 mm, blanked, electropolished, and yielded a thin foil specimen having a diameter of 3 mm for transmission electron microscopic (TEM) observation.

An exemplary observation and measurement will be illustrated with reference to FIGS. 3a, 3b, and 3c. Initially, the entire microstructure of the specimen was observed in a bright field image under low magnification (e.g., 5000-fold magnification) with the transmission electron microscope, the position of retained austenite was determined in a dark field image, and focused on the retained austenite under high magnification (150000-fold magnification). The bright field image is indicated in FIG. 3a. Such retained austenite is generally more easily identified in a dark field image as compared with a bright field image. The bright field image of FIG. 3a was therefore converted into a dark field image in FIG. 3b, based on which stacking faults in the retained austenite were observed. The stacking faults are indicated by the arrows in the photomicrograph of FIG. 3b. FIG. 3c schematically illustrates the region of retained austenite, and the stacking faults in the retained austenite appearing in the photomicrograph of FIG. 3b. All vertical lines and diagonal lines in the retained austenite region in FIG. 3c represent stacking faults.

Based on the photomicrograph, the amount of stacking faults in the retained austenite was determined by dividing the total sum of length of stacking faults in the retained austenite by the area of the retained austenite. The measurement was performed on ten samples (n=10) including retained austenite, and ten measurements were averaged.

Measurement Conditions
Electrolytical Thin Foil Preparation
Preparation procedure: cutting, polishing (0.1 mm in thickness), blanking (3 mm in diameter), and electropolishing performed in this order
Preparation equipment: Tenupol-3 supplied by Struers A/S
Electrolytic solution: 5% perchloric acid-95% acetic acid
TEM Observation
TEM observation equipment: Transmission Electron Microscope H-800 supplied by Hitachi, Ltd.
Acceleration voltage: 200 kV
Mechanical Properties Evaluation The mechanical properties of a steel test sample were evaluated by preparing a No. 5 specimen prescribed in JIS Z2201, subjecting the specimen to a tensile test, and measuring the yield strength (YS in MPa), tensile strength (TS in MPa), and ductility (EL in %). The specimen was cut out from the test sample so as to have a longitudinal direction as a direction perpendicular to the rolling direction. The measured tensile strength was multiplied by the ductility and gave a product as TS×EL balance (TS×EL).

The tensile strength (TS) herein was evaluated as follows. A sample having a tensile strength of 1180 MPa or more was evaluated as having a high strength (accepted); whereas a sample having a tensile strength less than 1180 MPa was evaluated as having an insufficient strength (rejected).

For the ductility (EL), a sample having a ductility of 12% or more was evaluated as having excellent ductility (accepted); whereas a sample having a ductility less than 12% was evaluated as having insufficient ductility (rejected).

For the balance between strength and ductility (TS×EL balance), a sample having a product of TS (MPa) and EL (%) of 15000 (MPa·%) or more was evaluated as having excellent balance between strength and ductility (accepted); whereas a sample having a product of TS (MPa) and EL (%) less than 15000 (MPa·%) was evaluated as having insufficient balance between strength and ductility (rejected).

Low-Temperature Toughness Evaluation

The low-temperature toughness was evaluated in the following manner. JIS No. 4 Charpy specimens prescribed in Charpy impact test in JIS Z2224 were prepared and subjected to the Charpy test at −40° C. two times to measure a brittle fracture surface ratio and an absorbed energy (J). The absorbed energy at −40° C. alone is indicated in Tables 4 and 5 below. A sample having an average absorbed energy (J) at −40° C. of 9 or more was evaluated as having excellent low-temperature toughness (accepted); whereas a sample having an average absorbed energy (J) at −40° C. less than 9 J was evaluated as having poor low-temperature toughness (rejected).

Results of these evaluations are indicated in Tables 5 to 7.

For Steel Y and Steel Z, steel sheets after cold rolling underwent cracking and were not subjected to the subsequent continuous annealing. Steel Y had excessively high carbon and silicon contents. Steel Z had an excessively high Mn content. These steels are samples having chemical compositions not meeting the conditions specified in the present invention and underwent cracking probably because the steel sheets after hot rolling had excessively high strengths.

TABLE 1

| Steel | Chemical composition (mass %) | | | | | | | | | | | |
|---|---|---|---|---|---|---|---|---|---|---|---|---|
|  | C | Si | Mn | P | S | Al | N | O | Cr | Mo | Ti | Nb |
| A | 0.19 | 2.0 | 2.6 | 0.01 | 0.001 | 0.04 | 0.0030 | 0.001 |  |  | 0.015 |  |
| B | 0.19 | 1.8 | 2.6 | 0.01 | 0.001 | 0.04 | 0.0030 | 0.001 |  |  | 0.015 |  |
| C | 0.19 | 2.0 | 2.4 | 0.01 | 0.002 | 0.03 | 0.0040 | 0.001 |  |  | 0.015 |  |
| D | 0.23 | 2.0 | 2.4 | 0.01 | 0.002 | 0.03 | 0.0030 | 0.001 |  |  | 0.015 |  |
| E | 0.23 | 2.0 | 2.2 | 0.02 | 0.001 | 0.03 | 0.0030 | 0.001 |  |  |  |  |
| F | 0.28 | 2.0 | 2.2 | 0.01 | 0.001 | 0.04 | 0.0040 | 0.001 |  |  | 0.015 |  |
| G | 0.28 | 2.0 | 2.0 | 0.02 | 0.001 | 0.04 | 0.0030 | 0.001 |  |  | 0.015 |  |
| H | 0.3 | 2.0 | 2.0 | 0.01 | 0.002 | 0.04 | 0.0030 | 0.001 |  |  | 0.015 |  |
| I | 0.28 | 1.5 | 2.6 | 0.01 | 0.001 | 0.03 | 0.0030 | 0.001 |  |  | 0.015 |  |
| J | 0.28 | 1.5 | 2.4 | 0.02 | 0.001 | 0.04 | 0.0040 | 0.001 |  |  | 0.015 |  |
| K | 0.19 | 2.0 | 2.2 | 0.01 | 0.001 | 0.03 | 0.0030 | 0.001 | 0.30 |  |  |  |
| L | 0.19 | 2.0 | 2.4 | 0.01 | 0.001 | 0.03 | 0.0030 | 0.001 |  |  |  |  |
| M | 0.19 | 2.0 | 2.2 | 0.01 | 0.001 | 0.03 | 0.0030 | 0.001 |  | 0.30 |  |  |
| N | 0.19 | 2.0 | 2.4 | 0.01 | 0.001 | 0.03 | 0.0030 | 0.001 | 0.30 |  | 0.015 |  |
| O | 0.23 | 2.0 | 2.4 | 0.01 | 0.001 | 0.03 | 0.0030 | 0.001 |  |  |  |  |
| P | 0.19 | 2.0 | 2.4 | 0.01 | 0.001 | 0.03 | 0.0030 | 0.001 |  |  |  | 0.015 |
| Q | 0.19 | 2.0 | 2.6 | 0.01 | 0.001 | 0.04 | 0.0040 | 0.001 |  |  |  |  |
| R | 0.26 | 2.0 | 2.4 | 0.01 | 0.001 | 0.04 | 0.0030 | 0.001 |  | 0.10 |  |  |
| S | 0.19 | 2.0 | 2.6 | 0.01 | 0.001 | 0.04 | 0.0040 | 0.001 | 0.10 |  | 0.015 |  |
| T | 0.19 | 2.0 | 2.6 | 0.01 | 0.001 | 0.04 | 0.0030 | 0.001 |  |  | 0.015 |  |
| U | 0.23 | 2.0 | 2.3 | 0.02 | 0.001 | 0.03 | 0.0030 | 0.001 |  | 0.10 |  | 0.015 |
| V | 0.07 | 1.8 | 2.6 | 0.02 | 0.002 | 0.03 | 0.0030 | 0.001 |  |  |  |  |
| W | 0.19 | 1.2 | 2.4 | 0.01 | 0.001 | 0.04 | 0.0020 | 0.001 |  |  |  |  |
| X | 0.19 | 2.0 | 0.4 | 0.01 | 0.002 | 0.04 | 0.0020 | 0.001 |  |  |  |  |
| Y | 0.35 | 3.5 | 2.3 | 0.02 | 0.001 | 0.03 | 0.0010 | 0.001 |  |  |  | 0.015 |
| Z | 0.18 | 1.9 | 3.5 | 0.01 | 0.002 | 0.03 | 0.0030 | 0.001 |  |  |  |  |

| Steel | Chemical composition (mass %) | | | | | | | $A_{c1}$ (° C.) | $A_{c2}$ (° C.) |
|---|---|---|---|---|---|---|---|---|---|
|  | V | Cu | Ni | B | Ca | Mg | REM |  |  |
| A |  |  |  |  |  |  |  | 753 | 862 |
| B |  |  |  |  |  |  |  | 748 | 853 |
| C |  |  |  |  |  |  |  | 756 | 864 |
| D |  |  |  |  |  |  |  | 756 | 855 |

TABLE 1-continued

| Steel | | | | | | | | |
|---|---|---|---|---|---|---|---|---|
| E | | | | | | | 758 | 862 |
| F | | | | | | | 758 | 855 |
| G | | | | | | | 760 | 868 |
| H | | | | | | | 760 | 854 |
| I | | | | | | | 739 | 817 |
| J | | | | | | | 741 | 834 |
| K | | | | | | | 763 | 861 |
| L | | | | 0.0035 | | | 756 | 858 |
| M | | | | | | | 758 | 873 |
| N | | | | | | | 761 | 857 |
| O | | 0.10 | 0.10 | | | | 754 | 846 |
| P | | 0.10 | 0.10 | | | | 754 | 854 |
| Q | 0.015 | | | 0.0035 | | | 753 | 857 |
| R | | | | | 0.0050 | | 756 | 847 |
| S | | | 0.10 | 0.0035 | 0.0050 | | 753 | 859 |
| T | | | | | | 0.0050 | 753 | 860 |
| U | | | 0.10 | | 0.0050 | | 755 | 862 |
| V | | | | | | | 748 | 885 |
| W | | | | 0.0035 | | | 732 | 826 |
| X | | | | | | | 777 | 822 |
| Y | | | | | | | 800 | 903 |
| Z | | | | | | | 741 | 823 |

TABLE 2

| Test number | Steel | Steel sheet form | Production method | $Ac_1 + 20$ (°C.) | $Ac_2$ (°C.) | Soaking temperature (°C.) | Average cooling rate 1 (°C./s) | Cooling stop temperature (°C.) |
|---|---|---|---|---|---|---|---|---|
| 1 | A | CR | I | 773 | 862 | 820 | 15 | 150 |
| 2 | A | GA | I | 773 | 862 | 830 | 20 | 125 |
| 3 | A | CR | I | 773 | 862 | 830 | 20 | 420 |
| 4 | A | CR | I | 773 | 862 | 830 | 20 | 420 |
| 5 | A | EG | I | 773 | 862 | 830 | 15 | 200 |
| 6 | A | EG | I | 773 | 862 | 820 | 15 | 180 |
| 7 | A | CR | I | 773 | 862 | 830 | 20 | 420 |
| 8 | A | CR | I | 773 | 862 | 830 | 20 | 420 |
| 9 | B | CR | II | 768 | 853 | 920 | 10 | 300 |
| 10 | B | CR | I | 768 | 853 | 840 | 20 | 200 |
| 11 | C | CR | I | 776 | 864 | 830 | 20 | 250 |
| 12 | C | GA | II | 776 | 864 | 910 | 20 | 400 |
| 13 | D | CR | I | 776 | 855 | 830 | 20 | 180 |
| 14 | E | CR | I | 778 | 862 | 820 | 20 | 150 |
| 15 | F | GI | I | 778 | 855 | 820 | 20 | 150 |
| 16 | G | CR | I | 780 | 868 | 820 | 20 | 150 |
| 17 | H | CR | I | 780 | 854 | 820 | 20 | 150 |
| 18 | I | CR | II | 759 | 817 | 820 | 20 | 150 |
| 19 | I | EG | II | 759 | 817 | 820 | 20 | 150 |
| 20 | J | CR | I | 761 | 834 | 820 | 20 | 150 |
| 21 | J | EG | I | 761 | 834 | 820 | 20 | 150 |
| 22 | K | EG | II | 783 | 861 | 910 | 20 | 300 |

| Test number | Average rate of temperature rise (°C./s) | Austempering temperature (°C.) | Austempering time (s) | Average cooling rate 2 (°C./s) | Reheating temperature (°C.) | Reheating time (s) |
|---|---|---|---|---|---|---|
| 1 | 1 | 400 | 900 | 3 | 85 | 20 |
| 2 | 5 | 350 | 300 | 0.5 | 150 | 500 |
| 3 | 0 | 420 | 500 | 15 | — | — |
| 4 | 0 | 420 | 500 | 20 | — | — |
| 5 | 1 | 400 | 900 | 3 | 55 | 300 |
| 6 | 1 | 400 | 900 | 2 | 55 | 500 |
| 7 | 0 | 420 | 500 | 7 | 200 | 1000 |
| 8 | 0 | 420 | 500 | 15 | 40 | 20 |
| 9 | 1 | 420 | 700 | 2 | 85 | 300 |
| 10 | 1 | 350 | 900 | 5 | 85 | 150 |
| 11 | 1 | 350 | 700 | 10 | 85 | 100 |
| 12 | 1 | 420 | 100 | 0.5 | 150 | 500 |
| 13 | 1 | 350 | 500 | 3 | 100 | 100 |
| 14 | 1 | 350 | 500 | 3 | 85 | 150 |
| 15 | 1 | 350 | 500 | 1 | 150 | 500 |
| 16 | 1 | 350 | 500 | 3 | 85 | 20 |
| 17 | 1 | 350 | 500 | 3 | 85 | 20 |
| 18 | 1 | 350 | 500 | 3 | 85 | 20 |

TABLE 2-continued

| | | | | | | |
|---|---|---|---|---|---|---|
| 19 | 1 | 350 | 500 | 2 | 55 | 300 |
| 20 | 1 | 350 | 500 | 5 | 85 | 300 |
| 21 | 1 | 350 | 500 | 3 | 60 | 300 |
| 22 | 1 | 420 | 500 | 3 | 55 | 100 |

TABLE 3

| Test number | Steel | Steel sheet form | Production method | $Ac_1 + 20$ (°C.) | $Ac_2$ (°C.) | Soaking temperature (°C.) | Average cooling rate 1 (°C./s) | Cooling stop temperature (°C.) |
|---|---|---|---|---|---|---|---|---|
| 23 | L | CR | II | 776 | 858 | 910 | 20 | 300 |
| 24 | M | CR | II | 778 | 873 | 910 | 20 | 300 |
| 25 | N | CR | II | 781 | 857 | 910 | 20 | 300 |
| 26 | O | CR | I | 774 | 846 | 830 | 20 | 180 |
| 27 | P | CR | II | 774 | 854 | 810 | 20 | 300 |
| 28 | Q | CR | II | 773 | 857 | 910 | 20 | 300 |
| 29 | R | CR | I | 776 | 847 | 830 | 50 | 150 |
| 30 | S | CR | I | 773 | 859 | 830 | 50 | 150 |
| 31 | T | CR | I | 773 | 860 | 830 | 50 | 150 |
| 32 | U | CR | II | 775 | 862 | 910 | 50 | 300 |
| 33 | V | CR | I | 768 | 885 | 830 | 15 | 250 |
| 34 | W | CR | II | 752 | 826 | 900 | 15 | 300 |
| 35 | X | CR | I | 797 | 922 | 830 | 15 | 250 |
| 36 | U | CR | II | 775 | 862 | 900 | 100 | 200 |
| 37 | U | EG | I | 775 | 862 | 830 | 3 | 200 |
| 38 | U | CR | I | 775 | 862 | 830 | 20 | 20 |
| 39 | U | CR | I | 775 | 862 | 830 | 20 | 450 |
| 40 | U | CR | I | 775 | 862 | 830 | 20 | 450 |
| 41 | U | EG | I | 775 | 862 | 845 | 20 | 600 |
| 42 | U | CR | I | 775 | 862 | 845 | 20 | 400 |
| 43 | U | GA | I | 775 | 862 | 845 | 20 | 200 |
| 44 | U | CR | I | 775 | 862 | 840 | 20 | 200 |
| 45 | U | CR | I | 775 | 862 | 840 | 20 | 200 |

| Test number | Average rate of temperature rise (°C./s) | Austempering temperature (°C.) | Austempering time (s) | Average cooling rate 2 (°C./s) | Reheating temperature (°C.) | Reheating time (s) |
|---|---|---|---|---|---|---|
| 23 | 1 | 420 | 500 | 3 | 85 | 500 |
| 24 | 1 | 420 | 500 | 3 | 100 | 500 |
| 25 | 1 | 420 | 500 | 3 | 150 | 20 |
| 26 | 1 | 350 | 500 | 3 | 85 | 20 |
| 27 | 1 | 420 | 500 | 2 | 85 | 20 |
| 28 | 1 | 420 | 500 | 0.4 | 85 | 50 |
| 29 | 1 | 350 | 300 | 2 | 85 | 50 |
| 30 | 1 | 350 | 500 | 2 | 85 | 50 |
| 31 | 1 | 350 | 500 | 2 | 85 | 100 |
| 32 | 1 | 420 | 500 | 2 | 85 | 50 |
| 33 | 1 | 400 | 900 | 2 | 85 | 100 |
| 34 | 1 | 400 | 900 | 2 | 85 | 50 |
| 35 | 1 | 400 | 900 | 2 | 85 | 100 |
| 36 | 1 | 400 | 700 | 2 | 85 | 100 |
| 37 | 1 | 400 | 700 | 2 | 55 | 100 |
| 38 | 1 | 400 | 700 | 2 | 85 | 20 |
| 39 | 1 | 450 | 700 | 2 | — | — |
| 40 | 1 | 450 | 700 | 2 | 200 | 1000 |
| 41 | −1 | 400 | 700 | 2 | 85 | 100 |
| 42 | 1 | 600 | 900 | 2 | 200 | 1000 |
| 43 | 1 | 470 | 30 | 0.5 | 200 | 700 |
| 44 | 1 | 400 | 700 | 2 | 500 | 700 |
| 45 | 1 | 50 | 500 | 2 | 60 | 700 |

TABLE 4

| Test number | Steel | Steel sheet form | Production method | $Ac_1 + 20$ (°C.) | $Ac_2$ (°C.) | Soaking temperature (°C.) | Average cooling rate 1 (°C./s) | Cooling stop temperature (°C.) |
|---|---|---|---|---|---|---|---|---|
| 46 | A | CR | I | 773 | 862 | 830 | 27 | 200 |
| 47 | A | CR | I | 773 | 862 | 830 | 29 | 250 |

TABLE 4-continued

| 48 | A | EG | I | 773 | 862 | 830 | 32 | 200 |
| 49 | A | GA | I | 773 | 862 | 830 | 34 | 150 |
| 50 | D | CR | I | 776 | 855 | 830 | 32 | 200 |
| 51 | D | CR | I | 776 | 855 | 830 | 32 | 200 |
| 52 | D | EG | I | 776 | 855 | 830 | 32 | 200 |
| 53 | N | CR | I | 781 | 857 | 830 | 27 | 150 |
| 54 | N | GA | I | 781 | 857 | 830 | 40 | 150 |
| 55 | U | CR | I | 775 | 862 | 830 | 48 | 200 |
| 56 | U | GA | I | 775 | 862 | 830 | 52 | 150 |

| Test number | Average rate of temperature rise (° C./s) | Austempering temperature (° C.) | Austempering time (s) | Average cooling rate 2 (° C./s) | Reheating temperature (° C.) | Reheating time (s) |
|---|---|---|---|---|---|---|
| 46 | 28 | 400 | 470 | 4 | 85 | 100 |
| 47 | 28 | 400 | 500 | 2 | 85 | 20 |
| 48 | 28 | 400 | 470 | 4 | 55 | 500 |
| 49 | 28 | 400 | 470 | 3 | 60 | 500 |
| 50 | 29 | 410 | 470 | 4 | 100 | 150 |
| 51 | 30 | 420 | 700 | 4 | 85 | 100 |
| 52 | 31 | 430 | 470 | 5 | 100 | 50 |
| 53 | 30 | 420 | 470 | 4 | 85 | 20 |
| 54 | 42 | 400 | 310 | 7 | 60 | 100 |
| 55 | 42 | 400 | 310 | 5 | 60 | 200 |
| 56 | 42 | 400 | 100 | 6 | 180 | 200 |

TABLE 5

| Test number | Steel | Steel sheet form | Ferrite (vol. %) | Bainitic ferrite/tempered martensite (vol. %) | MA (vol. %) | γ (vol. %) | Stacking faults in γ (nm/nm$^2$) | YS (MPa) | TS (MPa) | EL (%) | TS × EL (MPa · %) | Absorbed energy at −40° C. (J) |
|---|---|---|---|---|---|---|---|---|---|---|---|---|
| 1 | A | CR | 25 | 74 | 1 | 11 | 0.00082 | 957 | 1207 | 17.3 | 20881 | 9 |
| 2 | A | GA | 17 | 79 | 4 | 11 | 0.00046 | 943 | 1294 | 14.9 | 19281 | 10 |
| 3 | A | CR | 21 | 61 | 18 | 8 | 0.01780 | 790 | 1215 | 18.3 | 22235 | 3 |
| 4 | A | CR | 20 | 60 | 20 | 9 | 0.01240 | 803 | 1215 | 17.9 | 21749 | 5 |
| 5 | A | EG | 19 | 80 | 2 | 11 | 0.00039 | 929 | 1183 | 19.5 | 23069 | 9 |
| 6 | A | EG | 19 | 78 | 4 | 12 | 0.00024 | 910 | 1187 | 19.1 | 22672 | 10 |
| 7 | A | CR | 21 | 69 | 10 | 8 | 0.00300 | 810 | 1210 | 18.1 | 21901 | 9 |
| 8 | A | CR | 21 | 60 | 19 | 8 | 0.02050 | 791 | 1210 | 18.1 | 21901 | 5 |
| 9 | B | CR | 13 | 80 | 7 | 9 | 0.00025 | 1012 | 1290 | 12.1 | 15609 | 9 |
| 10 | B | CR | 25 | 69 | 6 | 10 | 0.00481 | 874 | 1214 | 15.6 | 18938 | 10 |
| 11 | C | CR | 30 | 58 | 12 | 12 | 0.00084 | 820 | 1189 | 14.5 | 17241 | 10 |
| 12 | C | GA | 17 | 68 | 15 | 16 | 0.00357 | 850 | 1210 | 13.6 | 16456 | 9 |
| 13 | D | CR | 24 | 73 | 3 | 10 | 0.00030 | 875 | 1250 | 17.5 | 21875 | 10 |
| 14 | E | CR | 29 | 67 | 4 | 9 | 0.00099 | 820 | 1202 | 16.5 | 19833 | 9 |
| 15 | F | GI | 15 | 80 | 5 | 11 | 0.00078 | 852 | 1276 | 17.8 | 22713 | 9 |
| 16 | G | CR | 19 | 77 | 4 | 10 | 0.00125 | 843 | 1212 | 16.3 | 19756 | 9 |
| 17 | H | CR | 21 | 75 | 4 | 11 | 0.00224 | 902 | 1250 | 18.3 | 22875 | 10 |
| 18 | I | CR | 15 | 80 | 5 | 9 | 0.00356 | 957 | 1280 | 14.7 | 18816 | 10 |
| 19 | I | EG | 14 | 80 | 6 | 8.2 | 0.00224 | 950 | 1274 | 14.5 | 18473 | 9 |
| 20 | J | CR | 18 | 76 | 6 | 9.8 | 0.00089 | 921 | 1212 | 13.8 | 16728 | 9 |
| 21 | J | EG | 19 | 74 | 7 | 9.7 | 0.00056 | 922 | 1210 | 13.6 | 16456 | 9 |
| 22 | K | EG | 21 | 72 | 7 | 11 | 0.00045 | 908 | 1205 | 13.5 | 16268 | 9 |

TABLE 6

| Test number | Steel | Steel sheet form | Ferrite (vol. %) | Bainitic ferrite/tempered martensite (vol. %) | MA (vol. %) | γ (vol. %) | Stacking faults in γ (nm/nm$^2$) | YS (MPa) | TS (MPa) | EL (%) | TS × EL (MPa · %) | Absorbed energy at −40° C. (J) |
|---|---|---|---|---|---|---|---|---|---|---|---|---|
| 23 | L | CR | 5 | 91 | 4 | 12 | 0.00023 | 957 | 1282 | 12.8 | 16410 | 9 |
| 24 | M | CR | 22 | 76 | 2 | 11 | 0.00089 | 910 | 1217 | 13.6 | 16795 | 10 |
| 25 | N | CR | 23 | 74 | 3 | 10 | 0.00074 | 960 | 1227 | 14.5 | 17792 | 10 |
| 26 | O | CR | 22 | 73 | 5 | 12 | 0.00056 | 930 | 1243 | 18.1 | 22498 | 10 |
| 27 | P | CR | 22 | 72 | 6 | 11 | 0.00054 | 908 | 1222 | 14.6 | 17841 | 9 |
| 28 | Q | CR | 5 | 90 | 5 | 10 | 0.00156 | 1033 | 1315 | 12.2 | 16043 | 10 |

TABLE 6-continued

| Test number | Steel | Steel sheet form | Ferrite (vol. %) | Bainitic ferrite/tempered martensite (vol. %) | MA (vol. %) | γ (vol. %) | Stacking faults in γ (nm/nm$^2$) | YS (MPa) | TS (MPa) | EL (%) | TS × EL (MPa · %) | Absorbed energy at −40° C. (J) |
|---|---|---|---|---|---|---|---|---|---|---|---|---|
| 29 | R | CR | 23 | 72 | 5 | 12 | 0.00189 | 956 | 1253 | 13.8 | 17291 | 10 |
| 30 | S | CR | 23 | 73 | 4 | 11 | 0.00245 | 933 | 1271 | 17.6 | 22370 | 9 |
| 31 | T | CR | 23 | 72 | 5 | 12 | 0.00220 | 881 | 1230 | 18.1 | 22263 | 10 |
| 32 | U | CR | 11 | 85 | 4 | 11 | 0.00248 | 1012 | 1275 | 16.8 | 21420 | 10 |
| 33 | V | CR | 25 | 73 | 2 | <u>3</u> | 0.00021 | 765 | <u>1154</u> | <u>11.3</u> | <u>13040</u> | 9 |
| 34 | W | CR | 10 | 88 | 2 | 7 | 0.00020 | 964 | <u>1180</u> | 12.3 | <u>14514</u> | 10 |
| 35 | X | CR | 14 | 84 | 2 | <u>4</u> | 0.00056 | 841 | <u>1152</u> | 12.2 | <u>14054</u> | 9 |
| 36 | U | CR | <u>0</u> | 90 | 10 | 8 | 0.00045 | 1194 | 1432 | <u>9.4</u> | <u>13461</u> | 9 |
| 37 | U | EG | <u>42</u> | 51 | 7 | 9 | 0.00124 | 645 | <u>904</u> | 22.4 | 20250 | 9 |
| 38 | U | CR | 20 | 75 | 5 | <u>3</u> | 0.00042 | 1145 | 1389 | <u>8.5</u> | <u>11807</u> | 9 |
| 39 | U | CR | 24 | 61 | 15 | 15 | <u>0.01856</u> | 820 | 1188 | 15.4 | 18295 | <u>4</u> |
| 40 | U | CR | 24 | 61 | 15 | 14 | 0.00475 | 857 | 1180 | 14.8 | 17464 | 9 |
| 41 | U | EG | 34 | <u>40</u> | <u>26</u> | 12 | 0.00241 | 784 | <u>1045</u> | 18.9 | 19751 | <u>4</u> |
| 42 | U | CR | 31 | 59 | 10 | 5 | 0.00020 | 741 | <u>1084</u> | 15.9 | 17236 | 9 |
| 43 | U | GA | 31 | <u>28</u> | <u>41</u> | 15 | 0.00454 | 945 | 1340 | 13.4 | 17956 | <u>3</u> |
| 44 | U | CR | 33 | 61 | 6 | 8 | 0.00042 | 741 | <u>1003</u> | 15.8 | 15847 | 9 |
| 45 | U | CR | 30 | 60 | 10 | <u>4</u> | 0.00041 | 1102 | 1347 | <u>9.6</u> | <u>13201</u> | 9 |

TABLE 7

| Test number | Steel | Steel sheet form | Ferrite (vol. %) | Bainitic ferrite/tempered martensite (vol. %) | MA (vol. %) | γ (vol. %) | Stacking faults in γ (nm/nm$^2$) | YS (MPa) | TS (MPa) | EL (%) | TS × EL (MPa · %) | Absorbed energy at −40° C. (J) |
|---|---|---|---|---|---|---|---|---|---|---|---|---|
| 46 | A | CR | 34 | 63 | 3 | 10 | 0.00080 | 895 | 1236 | 18.0 | 19712 | 11 |
| 47 | A | CR | 25 | 70 | 5 | 10 | 0.00356 | 973 | 1229 | 16.1 | 19791 | 10 |
| 48 | A | EG | 20 | 74 | 8 | 11 | 0.00271 | 971 | 1232 | 14.0 | 17242 | 9 |
| 49 | A | GA | 21 | 75 | 4 | 12 | 0.00243 | 1025 | 1284 | 12.3 | 15792 | 9 |
| 50 | D | CR | 22 | 71 | 7 | 12 | 0.00154 | 992 | 1216 | 15.3 | 18809 | 11 |
| 51 | D | CR | 18 | 80 | 2 | 9 | 0.00134 | 1013 | 1221 | 13.8 | 16792 | 11 |
| 52 | D | EG | 23 | 74 | 3 | 10 | 0.00084 | 995 | 1220 | 15.2 | 18544 | 11 |
| 53 | N | CR | 30 | 64 | 6 | 9 | 0.00364 | 931 | 1204 | 16.5 | 19868 | 9 |
| 54 | N | GA | 15 | 73 | 12 | 10 | 0.00421 | 977 | 1252 | 15.9 | 19847 | 9 |
| 55 | U | CR | 14 | 76 | 10 | 11 | 0.00214 | 970 | 1232 | 15.5 | 19098 | 9 |
| 56 | U | GA | 11 | 76 | 13 | 12 | 0.00128 | 977 | 1255 | 13.7 | 17129 | 9 |

Tables 1 to 7 demonstrate as follows. Samples of Test Nos. 1, 2, 5 to 7, 9 to 32, 40, and 46 to 56 are samples that were produced by preparing steels having chemical compositions meeting the conditions specified in the present invention and subjecting them to heat treatments under annealing conditions specified in the present invention Each of the samples had a microstructure meeting the conditions specified in the present invention, had excellent ductility even having a tensile strength on the order of 1180 MPa or more, and offered good strength-ductility balance (TSEL balance). In addition, the samples had excellent low-temperature toughness.

In contrast, samples of the other test numbers had a chemical composition and/or were produced under a production condition not meeting one or more of the conditions specified in the present invention. Accordingly, the samples failed to have desired properties including high strength, good workability, and satisfactory low-temperature toughness, as described in detail below.

Specifically, the sample of Test No. 33, as having an insufficient carbon content, had a low tensile strength, included retained austenite in an insufficient amount, offered poor ductility, and, as a result, had poor strength-ductility balance.

The sample of Test No. 34, as having an insufficient Si content, had poor strength-ductility balance.

The sample of Test No. 35, as having an insufficient Mn content, had a low tensile strength, included retained austenite in an insufficient amount, and had poor strength-ductility balance.

The sample of Test No. 36 underwent cooling from the soaking temperature ($Ac_3$ point or higher) at an excessively high rate, thereby failed to include ferrite, offered inferior ductility, and had poor strength-ductility balance.

The sample of Test No. 37 underwent cooling from the soaking temperature (lower than $Ac_3$ point) at an excessively low rate, thereby suffered from excess ferrite formation, and failed to have a tensile strength of 1180 MPa or more.

The sample of Test No. 38 underwent cooling down to an excessively low cooling stop temperature, thereby failed to include a sufficient amount of retained austenite, offered inferior ductility, and had poor strength-ductility balance.

The sample of Test No. 41 underwent cooling down to an excessively high cooling stop temperature, thereby failed to have a high strength, included MA constituents in excess, and had inferior low-temperature toughness.

The sample of Test No. 42 underwent austempering at an excessively high temperature and thereby failed to have a high strength. The sample of Test No. 45 underwent austempering at an excessively low temperature, thereby failed to include a sufficient amount of retained austenite, and had inferior strength-ductility balance.

The sample of Test No. 43 underwent austempering for an excessively short time, thereby failed to allow at least one of bainitic ferrite and tempered martensite to constitute the matrix, included a larger amount of MA constituents, and had inferior low-temperature toughness.

The samples of Test Nos. 3, 4, and 39 did not undergo reheating, thereby included a large amount of stacking faults in retained austenite, and had poor low-temperature toughness. The sample of Test No. 8 underwent reheating at an excessively low temperature, thereby included a large amount of stacking faults in retained austenite, and had poor low-temperature toughness. The sample of Test No. 44 underwent reheating at an excessively high temperature and thereby had an insufficient strength.

The invention claimed is:

1. A high-strength steel sheet having a tensile strength of 1180 MPa or more, the steel sheet comprising in a chemical composition:
   C in a content of 0.10% (in mass percent, hereinafter the same for chemical compositions) to 0.30%;
   Si in a content of 1.40% to 3.0%;
   Mn in a content of 0.5% to 3.0%;
   P in a content of 0.1% or less (excluding 0%);
   S in a content of 0.05% or less (excluding 0%);
   Al in a content of 0.005% to 0.20%;
   N in a content of 0.01% or less (excluding 0%); and
   O in a content of 0.01% or less (excluding 0%),
   with the remainder consisting of iron and inevitable impurities,
   wherein a microstructure at a position corresponding to one-fourth the thickness of the steel sheet meets all of the following conditions (1) to (4):
   (1) the microstructure comprises ferrite in a volume fraction of 5% to 35% and bainitic ferrite and/or tempered martensite in a volume fraction of 50% or more relative to the entire microstructure, where the volume fractions of ferrite and bainitic ferrite and/or tempered martensite are determined by scanning electron microscopic observation;
   (2) the microstructure comprises MA constituent in a volume fraction of 20% or less (excluding 0%) relative to the entire microstructure, where the MA constituent is a mixed structure of fresh martensite and retained austenite, and where the volume fraction of MA constituent is determined by optical microscopic observation;
   (3) the microstructure comprises retained austenite in a volume fraction of 5% or more relative to the entire microstructure, where the volume fraction of retained austenite is determined by X-ray diffractometry; and
   (4) the microstructure has an amount of stacking faults in the retained austenite of $10.0 \times 10^{-3}$ (nm/nm$^2$) or less, where the amount is determined by transmission electron microscopic observation.

2. The high-strength steel sheet according to claim 1, further comprising, on or over a surface thereof:
   an electrogalvanized layer;
   a hot-dip galvanized layer; or
   a hot-dip galvannealed layer.

3. The high-strength steel sheet according to claim 1, further comprising, in the chemical composition, at least one element selected from any of the following groups (A) to (E):
   (A) at least one element selected from the group consisting of:
   Cr in a content of 1.0% or less (excluding 0%); and
   Mo in a content of 1.0% or less (excluding 0%);
   (B) at least one element selected from the group consisting of:
   Ti in a content of 0.15% or less (excluding 0%);
   Nb in a content of 0.15% or less (excluding 0%); and
   V in a content of 0.15% or less (excluding 0%);
   (C) at least one element selected from the group consisting of:
   Cu in a content of 1.0% or less (excluding 0%); and
   Ni in a content of 1.0% or less (excluding 0%);
   (D) B in a content of 0.0050% or less (excluding 0%); and
   (E) at least one element selected from the group consisting of:
   Ca in a content of 0.0100% or less (excluding 0%);
   Mg in a content of 0.0100% or less (excluding 0%); and
   REM in a content of 0.0100% or less (excluding 0%).

4. A method for producing the high-strength steel sheet according to claim 1, the steel sheet having a tensile strength of 1180MPa or more, the method comprising:
   preparing a steel sheet having the chemical composition;
   subjecting the steel sheet sequentially to soaking in a temperature range from ($Ac_1$ point +20° C.) to lower than $Ac_3$ point, cooling down to a temperature range from 100° C. to 500° C. at an average cooling rate of 5° C/second or more, holding in the temperature range from 100° C. to 500° C. for 100 seconds or longer, and cooling down to room temperature; and
   reheating and holding the steel sheet in a temperature range from 50° C. to 200° C. for 20 seconds or longer.

5. A method for producing the high-strength steel sheet according to claim 1, the steel sheet having a tensile strength of 1180MPa or more, the method comprising:
   preparing a steel sheet having the chemical composition;
   subjecting the steel sheet sequentially to soaking in a temperature range from $Ac_3$ point to 950° C., cooling down to a temperature range from 100° C. to 500° C. at an average cooling rate of 50° C/second or less, holding in the temperature range from 100° C. to 500° C. for 100 seconds or longer, and cooling down to room temperature; and
   reheating and holding the steel sheet in a temperature range from 50° C. to 200° C. for 20 seconds or longer.

* * * * *